US012663863B2

(12) United States Patent (10) Patent No.: US 12,663,863 B2
Gupta et al. (45) Date of Patent: Jun. 23, 2026

(54) SYSTEMS AND METHODS FOR DETERMINING THE COUPLING RESPONSE OF A NON-LINEAR VARIANT SYSTEM

(71) Applicant: Georgia Tech Research Corporation, Atlanta, GA (US)

(72) Inventors: Ekansh Gupta, Atlanta, GA (US); Raghupathy Sivakumar, Atlanta, GA (US); Cheng-Yeh Chen, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 18/432,937

(22) Filed: Feb. 5, 2024

(65) Prior Publication Data

US 2024/0264670 A1 Aug. 8, 2024

Related U.S. Application Data

(60) Provisional application No. 63/483,143, filed on Feb. 3, 2023.

(51) Int. Cl.
*G06F 3/01* (2006.01)
*B25J 13/08* (2006.01)
(52) U.S. Cl.
CPC .............. *G06F 3/015* (2013.01); *B25J 13/08* (2013.01)
(58) Field of Classification Search
CPC .................................. G06F 3/015; B25J 13/08
USPC .................................................... 345/156–169
See application file for complete search history.

(56) References Cited

U.S. PATENT DOCUMENTS

| | | | | |
|---|---|---|---|---|
| 11,402,907 B2* | 8/2022 | Baba | .................... | A61B 5/7475 |
| 2019/0107888 A1* | 4/2019 | Sereshkeh | ............ | A61B 5/1103 |
| 2022/0051586 A1* | 2/2022 | Stankevich | .......... | A61B 5/7267 |
| 2022/0155867 A1* | 5/2022 | Connor | .................... | G02C 5/14 |
| 2023/0010664 A1* | 1/2023 | Zhang | .................... | G06F 3/015 |

(Continued)

FOREIGN PATENT DOCUMENTS

| | | | | |
|---|---|---|---|---|
| CA | 3134153 A1 * | 10/2020 | ........... | A61B 5/6803 |
| CA | 3214642 A1 * | 10/2022 | ............. | G06F 3/015 |

(Continued)

OTHER PUBLICATIONS

Wolpaw, et al., "An EEG-based Brain-computer Interface for Cursor Control", Electroencephalography and Clinical Neurophysiology, vol. 78, Issue 3, pp. 252-259, Mar. 1991.

(Continued)

*Primary Examiner* — Kwin Xie
(74) *Attorney, Agent, or Firm* — Meunier Carlin & Curfman LLC

(57) ABSTRACT

An exemplary system and method are disclosed that can detect unobserved and unobservable signals in a subject, or system, using an auxiliary, secondary signal measured from the subject while the unobserved and unobservable signals are known to be present. In particular, the exemplary system and method can used to measure observed signals, e.g., in a nonlinear time-variant system (NLTV system) such as the brain, to measure the unobserved or unobservable signal of interest via response coupling that employs a test instrument configured to facilitate interactions between the primary and the auxiliary signal.

18 Claims, 17 Drawing Sheets

(56) References Cited

U.S. PATENT DOCUMENTS

| | | | | |
|---|---|---|---|---|
| 2023/0032492 | A1* | 2/2023 | Kouider | G06F 3/013 |
| 2024/0366157 | A1* | 11/2024 | Moses | A61B 5/24 |

FOREIGN PATENT DOCUMENTS

| | | | | |
|---|---|---|---|---|
| WO | WO-2020086959 | A1 * | 4/2020 | G06N 7/01 |
| WO | WO-2022251472 | A1 * | 12/2022 | A61B 5/741 |

OTHER PUBLICATIONS

Xu, et al., "A Hybrid BCI Speller Paradigm Combining P300 Potential and the SSVEP Blocking Feature", Journal of Neural Engineering, vol. 10, 14 pages, 2013.

Xu, et al., "Accelerating Reinforcement Learning Using Eeg-based Implicit Human Feedback", Neurocomputing, vol. 460, 14 pages, Oct. 14, 2021.

Zobaer, et al., "K-Complexes, Spindles, and ERPs as Impulse Responses: Unification via Neural Field Theory", Biological Cybernetics, vol. 111, pp. 149-164, 2017.

"Brain Computer Interface Market Size, Share & Trends Analysis Report By Product (Invasive, Non-invasive), By Application (Healthcare, Communication & Control), By End Use, By Region, And Segment Forecasts, 2024-2030", https://www.grandviewresearch.com/industry-analysis/brain-computer-interfaces-market, 14 pages, 2021.

"Brain Computer Interface Market Size, Share, and Trends 2024 to 2033", Https://www.precedenceresearch.com/brain-computer-interface-market, 20 pages, 2021.

"Brain Computer Interface Market Size, Share, Competitive Landscape and Trend Analysis Report, by Component, Type and Application : Global Opportunity Analysis and Industry Forecast, 2021-2030", https://www.alliedmarketresearch.com/brain-computer-interfaces-market, 5 pages, Jul. 2021.

Arvaneh, et al., "Spatially Sparsed Common Spatial Pattern to Improve Bci Performance", ICASSP, IEEE International Conference on Acoustics, Speech and Signal Processing—Proceedings, pp. 2412-2415, 2011.

Barachant, et al., "Classification of Covariance Matrices using a Riemannian-based Kernel for BCI Applications", Neurocomputing, vol. 112, 12 pages, May 5, 2013.

Chauveau, et al., "Effects of Skull Thickness, Anisotropy, and Inhomogeneity on Forward EEG/ERP Computations Using a Spherical Three-Dimensional Resistor Mesh Model", Human Brain Mapping, vol. 21, pp. 86-97, 2004.

Coles, et al., "A Psychophysiological Investigation of the Continuous Flow Model of Human Information Processing", Journal of Experimental Psychology: Human Perception and Performance, vol. 11, No. 5, pp. 529-553, Oct. 1985.

Davila, et al., "Subspace Averaging of Steady-State Visual Evoked Potentials", IEEE Transactions on Biomedical Engineering, vol. 47, Issue 6, pp. 720-728, 2000.

Dowsett, et al., "Mobile Steady-state Evoked Potential Recording: Dissociable Neural Effects of Real-world Navigation and Visual Stimulation", Journal of Neuroscience Methods, vol. 332, 26 pages, 2020.

Duan, et al., "Quadcopter Flight Control Using a Non-invasive Multi-modal Brain Computer Interface", Frontiers in Neurorobotics, vol. 13, Article 23, 11 pages, May 31, 2019.

Falkenstein, et al., "Effects of Crossmodal Divided Attention on Late Erp Components. Li. Error Processing in Choice Reaction Tasks", Electroencephalography and Clinical Neurophysiology, vol. 78, Issue 6, pp. 447-455, Jun. 1991.

Falkenstein, et al., "Erp Components on Reaction Errors and Their Functional Significance: a Tutorial", Biological Psychology, vol. 51, pp. 87-107, 2000.

Farwell, et al., "Talking Off the Top of Your Head: Toward a Mental Prosthesis Utilizing Event-related Brain Potentials", Electroencephalography and Clinical Neurophysiology, vol. 70, pp. 510-523, 1988.

Fazli, et al., "Enhanced Performance by a Hybrid NIRS-EEG Brain Computer Interface", NeuroImage, vol. 59, Issue 1, pp. 519-529, 2012.

Fidêncio, et al., "Error-related Potentials in Reinforcement Learning-based Brain-machine Interfaces", Frontiers in Human Neuroscience, vol. 16, Article 806517, 21 pages, Jun. 2022.

Gandhi, et al., "Quantum Neural Network-Based EEG Filtering for a Brain-Computer Interface", IEEE Transactions on Neural Networks and Learning Systems, vol. 25, No. 2, pp. 278-288, Feb. 2014.

Garrett, et al., "Moment-to-moment Brain Signal Variability: A Next Frontier in Human Brain Mapping?", Neuroscience & Biobehavioral Reviews, vol. 37, No. 4, 29 pages, May 2013.

Gehring, et al., "A Neural System for error Detection and Compensation", Psychological Science, vol. 4, No. 6, pp. 385-390, Nov. 1993.

Gerven, et al., "The Brain-computer Interface Cycle", Journal of Neural Engineering, vol. 6, 11 pages, 2009.

Gibson, et al., "EEG Variability: Task-driven or Subject-driven Signal of Interest?", NeuroImage, vol. 252, May 15, 17 pages, 2022.

Gomez, et al., "Correcting Robot Mistakes in Real Time using EEG Signals", 2017 IEEE international conference on robotics and automation (ICRA), 9 pages, 2017.

Gupta, et al., "Blink to Get in: Biometric Authentication for Mobile Devices Using Eeg Signals", ICC 2020—2020 IEEE International Conference on Communications (ICC), 6 pages, 2020.

Jiang, et al., "A Brain-computer Interface for Single-trial Detection of Gait Initiation from Movement Related Cortical Potentials", Clinical Neurophysiology, vol. 126, 6 pages, 2015.

Kawala-Sterniuk, et al., "Summary of over Fifty Years with Brain-Computer Interfaces—A Review", Brain Sciences, vol. 11, No. 43, 41 pages, 2021.

Klimesch, Wolfgang., "EEG Alpha and Theta Oscillations Reflect Cognitive and Memory Performance: A Review and Analysis", Brain Research Reviews, vol. 29, pp. 169-195, 1999.

Lawhern, et al., "EEGNet: a Compact Convolutional Neural Network for EEG-based Brain-computer Interfaces", Journal of Neural Engineering, vol. 15, pp. 1-17, 2018.

Lei, et al., "Common Spatial Pattern Ensemble Classifier and Its Application in Brain-computer Interface", Journal of Electronic Science and Technology of China, vol. 7, No. 1, pp. 17-21, Mar. 2009.

Leistritz, et al., "Time-Variant Modeling of Brain Processes", Proceedings of the IEEE, vol. 104, Issue 2, pp. 262-281, Feb. 2016.

Lopez-Gordo, et al., "Use of Phase in Brain-Computer Interfaces based on Steady-State Visual Evoked Potentials", Neural Processing Letters, vol. 32, 9 pages, 2010.

Madore, et al., "Multicosts of Multitasking", Cerebrum, the Dana Forum on Brain Science, 8 pages, Apr. 2019.

Margaux, et al., "Objective and Subjective Evaluation of Online Error Correction During P300-Based Spelling", Advances in Human-Computer Interaction, vol. 2012, Article ID 578295, 13 pages, 2012.

Miltner, et al., "Event-Related Brain Potentials Following Incorrect Feedback in a Time-Estimation Task: Evidence for a "Generic" Neural System for Error Detection", Journal of Cognitive Neuroscience, vol. 9, No. 6, pp. 788-798, 1997.

Moisala, et al., "Brain Activity During Divided and Selective Attention to Auditory and Visual Sentence Comprehension Tasks", Frontiers in Human Neuroscience, vol. 1, Article 86, 15 pages, Feb. 19, 2015.

Mouli, et al., "Toward a Reliable PWM-based Light-emitting Diode Visual Stimulus for Improved SSVEP Response with Minimal Visual Fatigue", The Journal of Engineering, vol. 2017, Issue. 2, pp. 7-12, 2017.

Nijboer, et al., "Single-task fMRI Overlap Predicts Concurrent Multitasking Interference", NeuroImage, vol. 100, pp. 60-74, 2014.

Nijhol, Anton., "Bci for Games: a 'state of the art' Survey", Lecture Notes in Computer Science, pp. 225-228, 2008.

Norcia, et al., "The Steady-state Visual Evoked Potential in Vision Research: A Review", Journal of Vision, vol. 15, Issue 6, 46 pages, May 2015.

Notbohm, et al., "Modification of Brain Oscillations via Rhythmic Light Stimulation Provides Evidence for Entrainme. nt but not for

(56)          References Cited

OTHER PUBLICATIONS

Superposition of Event-Related Responses", Frontiers in Human Neuroscience, vol. 10, Article 10, 12 pages, Feb. 3, 2016.

Pires, et al., "Error-Related Potentials: Challenges and Applications", Frontiers in Human Neuroscience, vol. 16, 2 pages, Jul. 19, 2022.

Ramele, et al., "Eeg Waveform Analysis of P300 Erp With Applications to Brain Computer Interfaces", Brain Sciences, vol. 8, No. 199, 24 pages, 2018.

Raza, et al., "Covariate Shift Estimation Based Adaptive Ensemble Learning for Handling Non-stationarity in Motor Imagery Related EEG-based Brain-computer Interface", Neurocomputing, vol. 343, pp. 154-166, May 28, 2019.

Renard, et al., "OpenViBE: An Open-Source Software Platform to Design, Test and Use Brain-Computer Interfaces in Real and Virtual Environments", Presence: teleoperators and virtual environments, vol. 19, No. 1, 44 pages, 2010.

Rennie, et al., "Unified Neurophysical Model of EEG Spectra and Evoked Potentials", Biological Cybernetics, vol. 86, pp. 457-471, 2002.

Rivet, et al., "xDAWN Algorithm to Enhance Evoked Potentials: Application to Brain-computer Interface", IEEE Transactions on Biomedical Engineering, vol. 56, No. 8, 10 pages, 2009.

Saha, et al., "Progress in Brain Computer Interface: Challenges and Opportunities", Frontiers in Systems Neuroscience, vol. 15, Article 578875, 20 pages, Feb. 2021.

Schirrmeister, et al., "Deep Learning with Convolutional Neural Networks for EEG Decoding and Visualization", Human Brain Mapping, vol. 38, pp. 5391-5420, 2017.

Trueman, et al., "Choice Reaction Time and Learning", Springer, pp. 534-537, 2012.

Tweel, et al., "Human Visual Responses to Sinusoidally Modulated Light", Electroencephalography and Clinical Neurophysiology, vol. 18, Issue 6, pp. 587-598, May 1965.

Vourvopoulos, et al., "Effects of a Brain-Computer Interface With Virtual Reality (VR) Neurofeedback: A Pilot Study in Chronic Stroke Patients", Frontiers in Human Neuroscience, vol. 13, Article 210, 17 pages, Jun. 19, 2019.

Wang, et al., "Lead Selection for SSVEP-based brain-computer Interface", n The 26th Annual International Conference of the IEEE Engineering in Medicine and Biology Society, vol. 2, pp. 4507-4510, Sep. 1-5, 2004.

* cited by examiner

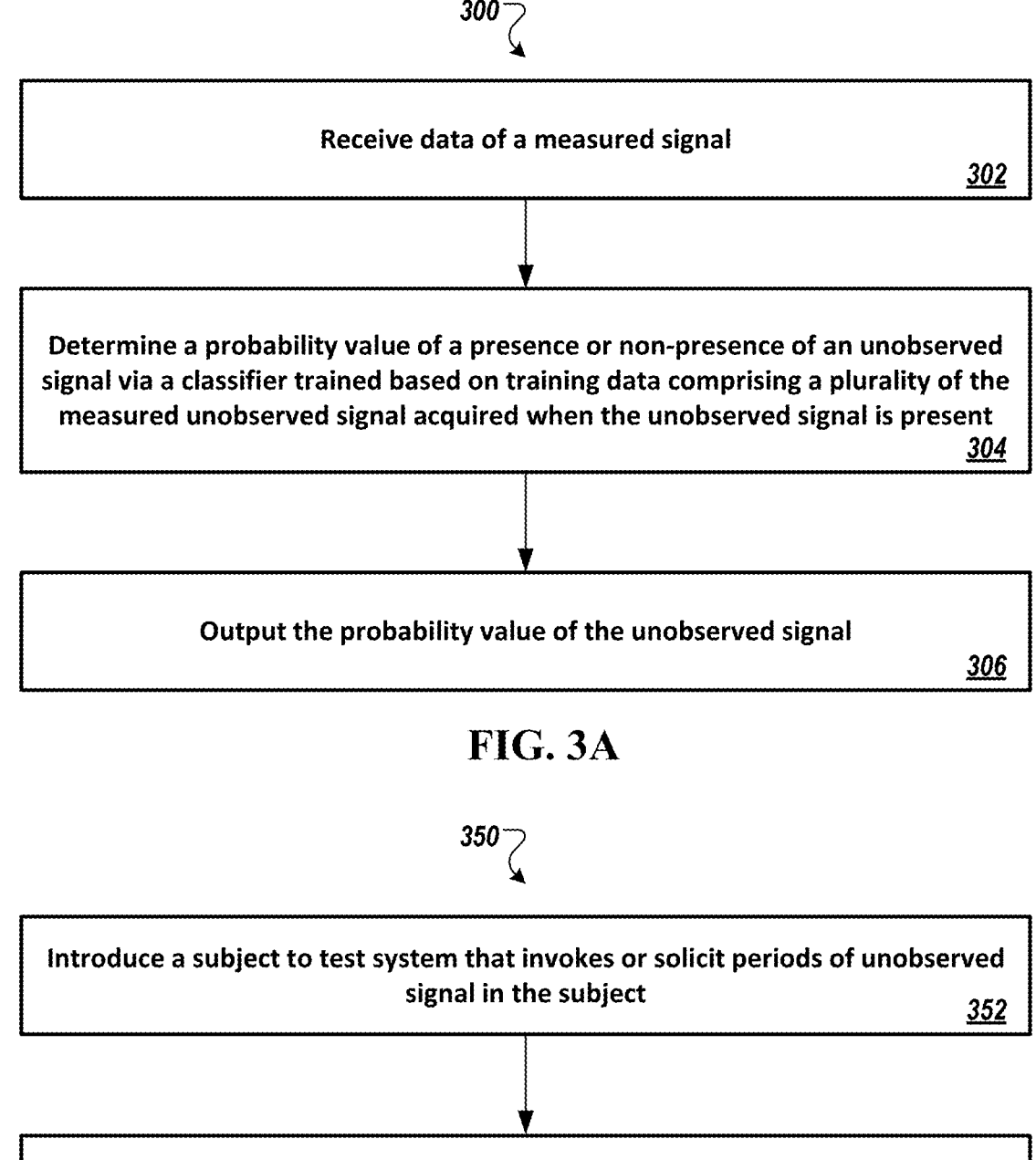

300

Receive data of a measured signal

302

Determine a probability value of a presence or non-presence of an unobserved signal via a classifier trained based on training data comprising a plurality of the measured unobserved signal acquired when the unobserved signal is present

304

Output the probability value of the unobserved signal

Introduce a subject to test system that invokes or solicit periods of unobserved signal in the subject

352

Acquire measured signal during presence of an unobserved signal

354

Train a classifier using the measured signal to provide output for presence or non-presence of the unobserved signal

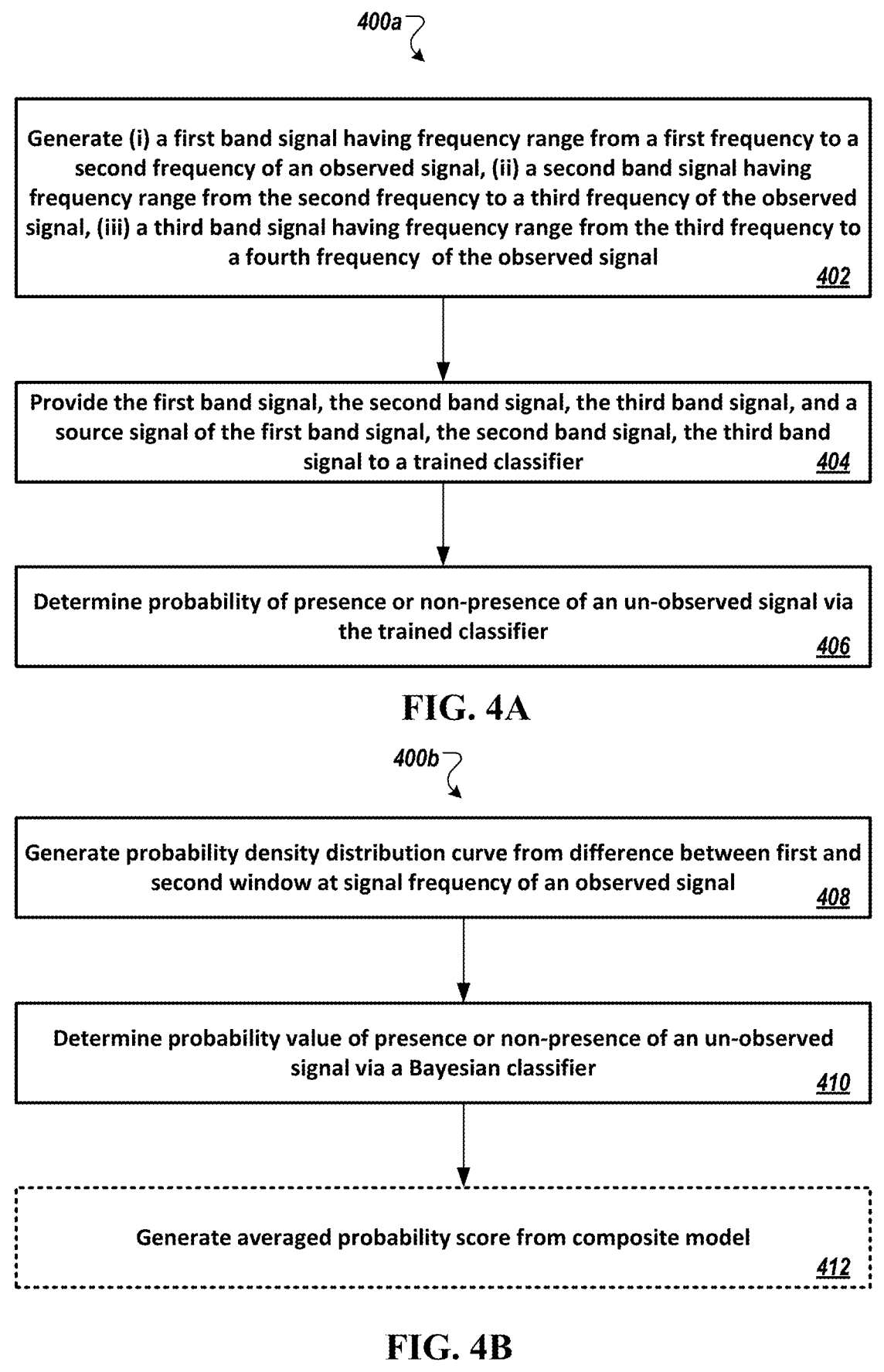

Generate (i) a first band signal having frequency range from a first frequency to a second frequency of an observed signal, (ii) a second band signal having frequency range from the second frequency to a third frequency of the observed signal, (iii) a third band signal having frequency range from the third frequency to a fourth frequency of the observed signal
_402_

Provide the first band signal, the second band signal, the third band signal, and a source signal of the first band signal, the second band signal, the third band signal to a trained classifier        _404_

Determine probability of presence or non-presence of an un-observed signal via the trained classifier        _406_

Generate probability density distribution curve from difference between first and second window at signal frequency of an observed signal        _408_

Determine probability value of presence or non-presence of an un-observed signal via a Bayesian classifier        _410_

Generate averaged probability score from composite model        _412_

FIG. 4B

450

Generate (i) a first band signal having frequency range from a first frequency to a second frequency of an observed training signal, (ii) a second band signal having frequency range from the second frequency to a third frequency of the observed signal, (iii) a third band signal having frequency range from the third frequency to a fourth frequency of the observed signal

452

Provide the first band signal, the second band signal, the third band signal, and a source signal of the first band signal, the second band signal, the third band signal as input to a classifier, the ground truth being an input associated with presence of an observed signal

454

Train the classifier

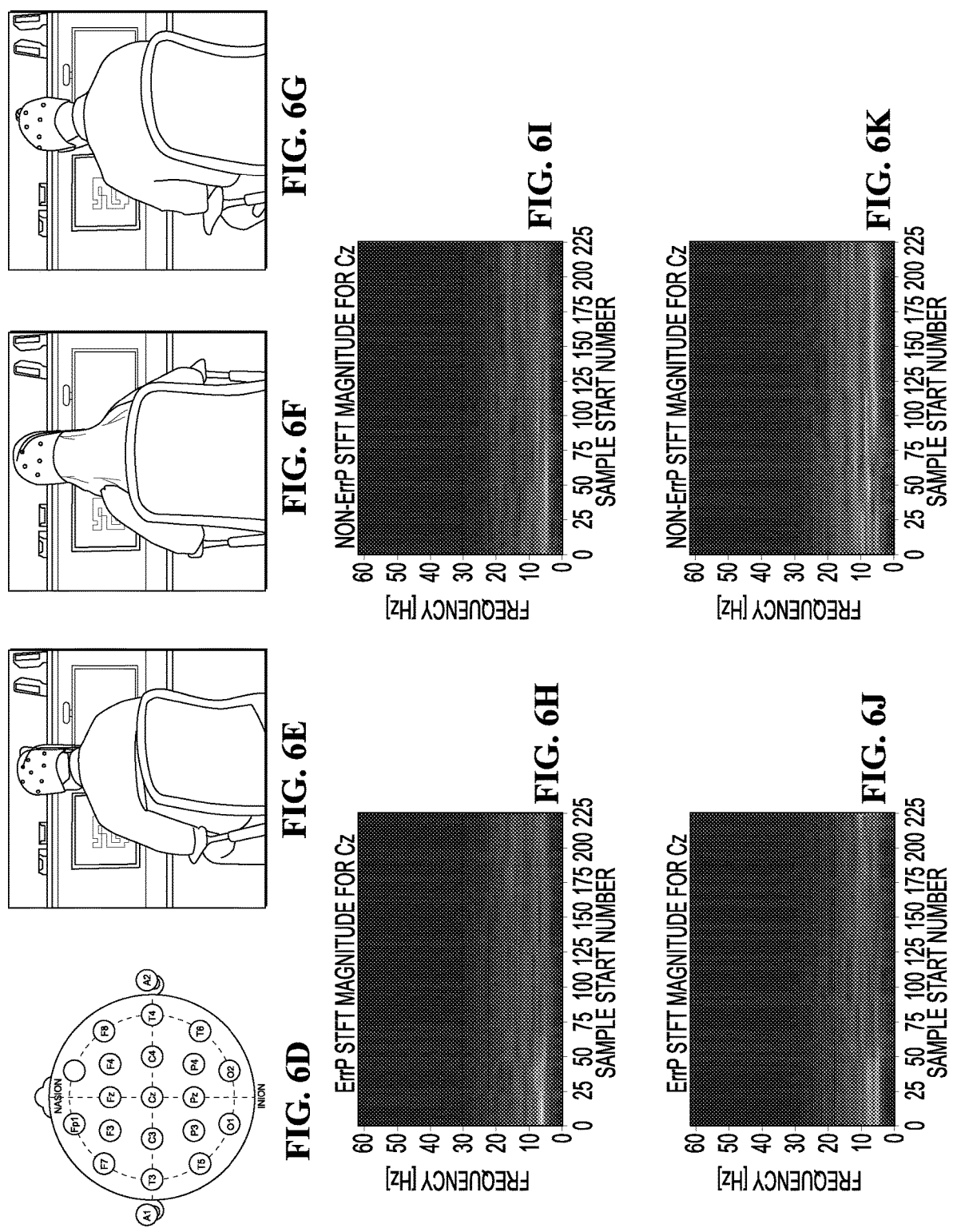

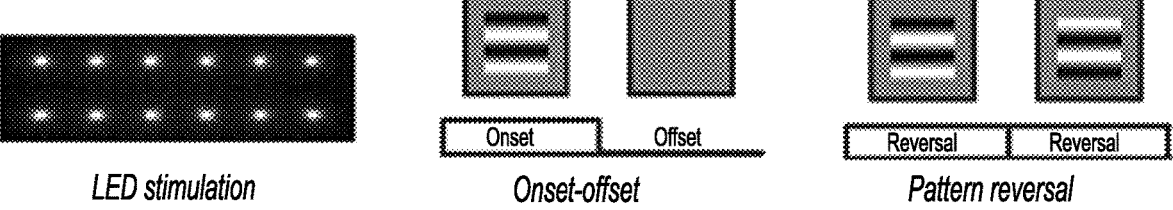
*LED stimulation*    *Onset-offset*    *Pattern reversal*
FIG. 7A
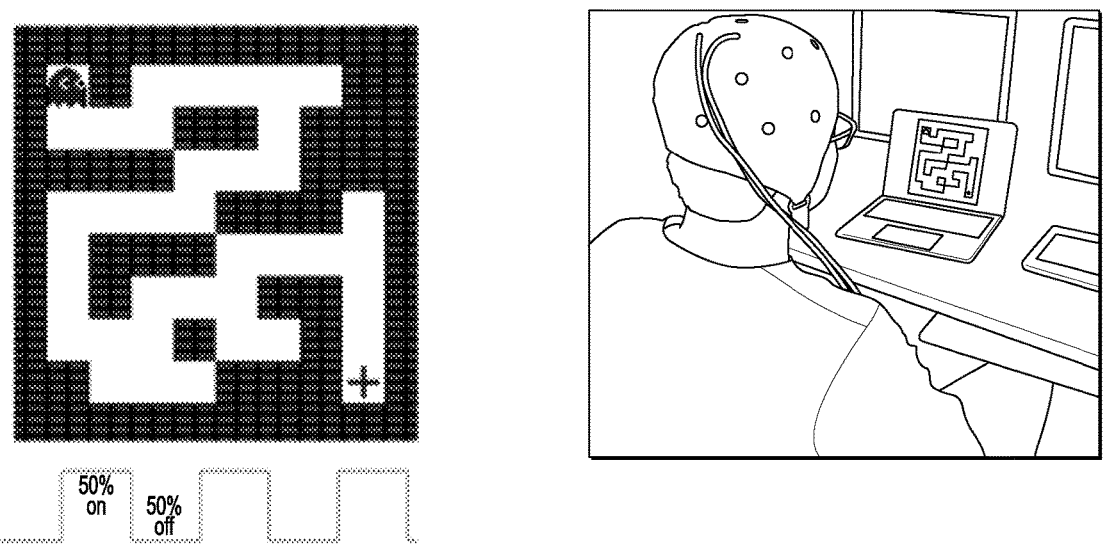
FIG. 7B    FIG. 7C

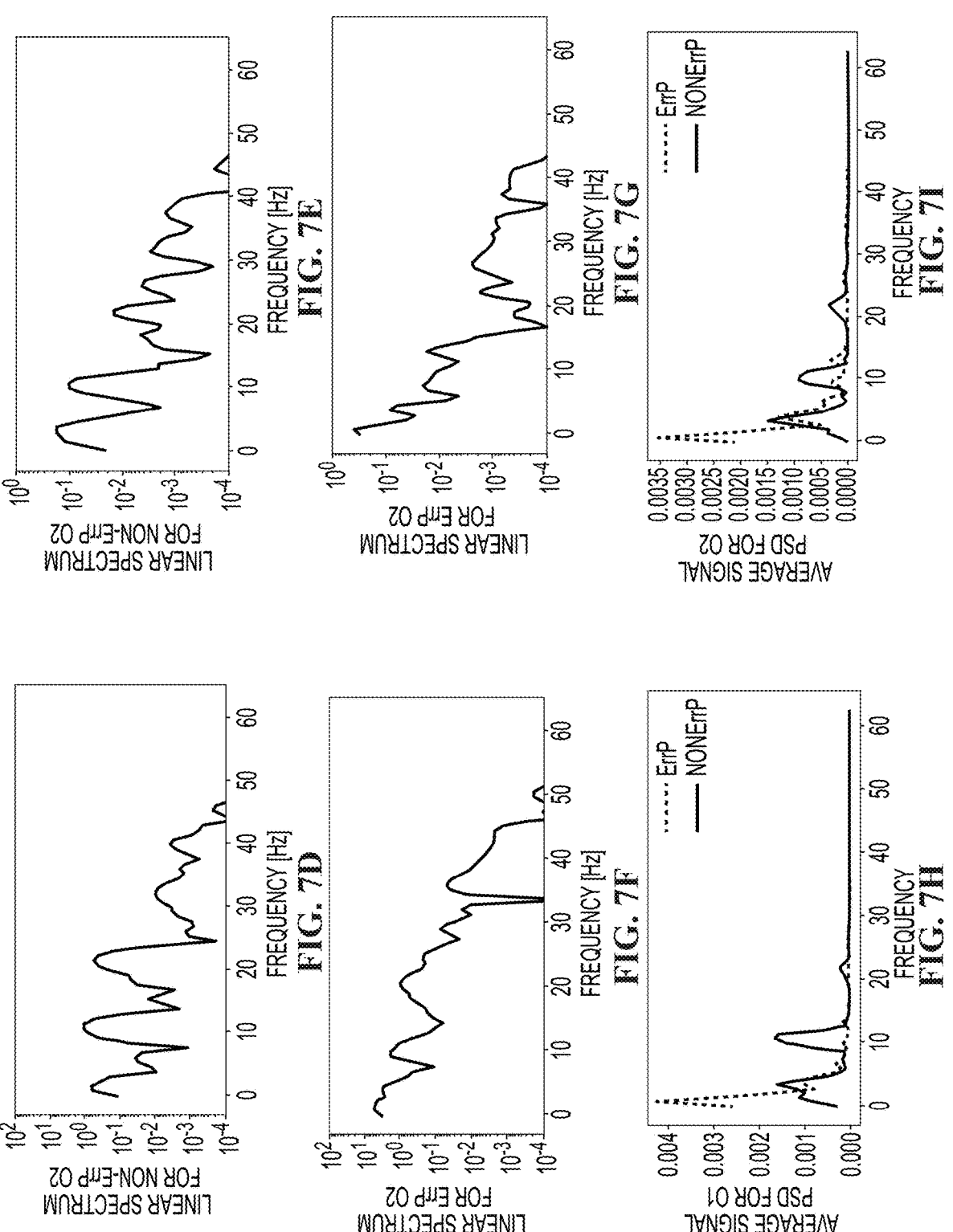

SYSTEMS AND METHODS FOR DETERMINING THE COUPLING RESPONSE OF A NON-LINEAR VARIANT SYSTEM

RELATED APPLICATION

This application claims priority to, and the benefit of, U.S. Provisional Patent Application No. 63/483,143, filed Feb. 3, 2023, which is incorporated by reference herein in its entirety.

GOVERNMENT LICENSE RIGHTS

This invention was made with Government support under Contract Number 1837369, awarded by the National Science Foundation. The Government has certain rights in the invention.

BACKGROUND

Event-Related Potentials (ERP) are useful for BCI applications as they can provide a generalized notion of error detection in a diverse set of tasks across a wide variety of input modalities (e.g., audio, visual, somatosensory, among others). ErrPs can potentially be used in applications for improving the performance and reliability of BCI spellers, correcting and adapting AI systems, as well as aiding in learning for AI agents like correcting a robot's mistakes and accelerating learning for a reinforcement learning agent.

The detection accuracy is poor as ErrP activity is minute (order of $\mu V$) and has to pass through layers of the skull, scalp, muscle, etc., consequently getting attenuated while also being corrupted by interference and noise from nearby neural activity, often performed in specialized facilities or research/development environment. Additionally, human brains can exhibit a lot of variance across users, tasks, environments, etc., so a model trained on one user with respect to a specified task may not generalize well to another user or task. The reliability of the detection and generalization of ErrPs is thus poor.

There is a benefit to improving the detection and generalization of ErrP and other difficult-to-observe signals.

SUMMARY

An exemplary system and method are disclosed that can detect unobserved and unobservable signals in a subject, or system, using an auxiliary, secondary signal measured from the subject while the unobserved and unobservable signals are known to be present. In particular, the exemplary system and method can used to measure observed signals, e.g., in a nonlinear time-variant system (NLTV system) such as the brain, to measure the unobserved or unobservable signal of interest via response coupling that employs a test instrument configured to facilitate interactions between the primary and the auxiliary signal.

The exemplary system and method can detect signals in the NLTV system without using supervised or data-dependent models. The response of an auxiliary signal input to the NLTV system can be used to determine the degradation, improvement, or change of the auxiliary signal and thereby reconstruct the primary unobserved and unobservable signals of interest and/or calculating other characteristics/properties of the system like attention, synchronization, etc. Brains, including human brains, can be modeled as NLTV systems. The exemplary system and method can be used in brain-computer interface systems and methods to acquire and/or reconstruct signals from the brain.

In an aspect, a system is disclosed comprising: a processor; and a memory having instructions stored thereon, wherein execution of the instructions by the processor causes the processor to: receive data of a measured signal (e.g., steady state visually evoked potential (SSVEP) signal); determine a probability value of a presence or non-presence of an unobserved signal (e.g., ErrP signal, EEG) via a trained classifier, wherein the trained classifier was trained based on training data comprising a plurality of the measured unobserved signal acquired when the unobserved signal is present; and output the probability value of presence of the unobserved signal, or a value derived therefrom, wherein the probability value is employed in a control or a diagnostic operation.

In some embodiments, the measured signal is acquired via a brain-computer interface (BCI).

In some embodiments, the measured signal has a simultaneous combined response in a subject with the unobserved signal.

In some embodiments, the instructions to determine the probability value of a presence or non-presence of an unobserved signal (e.g., ErrP signal, EEG) comprises: instructions to generate (i) a first band signal having a frequency range from a first frequency to a second frequency of an observed signal, (ii) a second band signal having a frequency range from the second frequency to a third frequency of the observed signal, (iii) a third band signal having frequency range from the third frequency to a fourth frequency of the observed signal; and instructions to provide the first band signal, the second band signal, the third band signal, and a source signal of the first band signal, the second band signal, the third band signal to the trained classifier.

In some embodiments, the instructions to determine the probability value of a presence or non-presence of an unobserved signal (e.g., ErrP signal, EEG) comprises: instructions to generate a probability density distribution curve from a difference between a first window of signal frequency of the observed signal and a second window of signal frequency of the observed signal, wherein the first window and the second window have different frequencies; and instructions to determine the probability value of presence or non-presence of the unobserved signal via a Bayesian classifier.

In another aspect, a method is disclosed comprising: receiving, by a processor, data of a measured signal (e.g., steady state visually evoked potential (SSVEP) signal); determining, by the processor, a probability value of a presence or non-presence of an unobserved signal (e.g., ErrP signal, EEG) via a trained classifier, wherein the trained classifier was trained based on training data comprising a plurality of the measured unobserved signal acquired when the unobserved signal is present; and outputting the probability value of the presence of the unobserved signal, or a value derived therefrom, wherein the probability value is employed in a control or a diagnostic operation.

In some embodiments, the measured signal is acquired as a physiological response to a stimulus (e.g., light stimuli).

In some embodiments, the measured signal comprises an offset-onset SSVEP signal or a pattern reversal SSVEP.

In some embodiments, the measured signal is acquired via a brain-computer interface (BCI).

In some embodiments, the measured signal has a simultaneous combined response in a subject with the unobserved signal.

In some embodiments, the measured signal was acquired while a display is contemporaneously presenting an observable error in the movement or action of a graphical element.

In some embodiments, the outputted probability value of the presence of the unobserved signal, or a value derived therefrom, is employed as a human-in-the-loop input signal for an AI training system.

In some embodiments, the AI training system is configured to generate a trained AI system for the control of a robot.

In some embodiments, the AI training system is configured to generate a trained AI system for control of a computing task.

In some embodiments, determining the probability value of a presence or non-presence of an unobserved signal (e.g., ErrP signal, EEG) comprises: generating a probability density distribution curve from a difference between a first window of signal frequency of the observed signal and a second window of signal frequency of the observed signal, wherein the first window and the second window has different frequencies; and determining the probability value of presence or non-presence of the unobserved signal via a Bayesian classifier.

In some embodiments, the probability value of the presence or non-presence of the unobserved signal is a composite score from two or more scores, including a score from the Bayesian classifier.

In another aspect, a non-transitory computer-readable medium is disclosed having instructions stored thereon, wherein execution of the instructions by a processor causes the processor to: receive data of a measured signal (e.g., steady state visually evoked potential (SSVEP) signal); determine a probability value of a presence or non-presence of an unobserved signal (e.g., ErrP signal, EEG) via a trained classifier, wherein the trained classifier was trained based on training data comprising a plurality of the measured unobserved signal acquired when the unobserved signal is present; and output the probability value of the presence of the unobserved signal, or a value derived therefrom, wherein the probability value is employed in a control or a diagnostic operation.

In some embodiments, the measured signal is acquired via a brain-computer interface (BCI).

In some embodiments, the measured signal has a simultaneous combined response in a subject with the unobserved signal.

In some embodiments, the outputted probability value of the presence of the unobserved signal, or a value derived therefrom, is employed as a human-in-the-loop control signal.

In another aspect, the present disclosure relates to a system for decoding a primary signal in a nonlinear time-variant system. In one embodiment, the system includes at least one processor; a memory operably coupled to the processor, the memory having computer-executable instructions stored thereon; a decoder module stored in the memory that, when executed by the at least one processor, is configured to: apply an auxiliary signal to the nonlinear time-variant system; measure a signal of the nonlinear time-variant system; detect, in the signal of the system, a response to the auxiliary signal; determine degradation of the response to the auxiliary signal; and decode a primary signal in the system based on the degradation of the response to the auxiliary signal.

In some embodiments, the nonlinear time-variant system is a brain.

In some embodiments, the primary signal comprises an event-related potential (ERP).

In some embodiments, the auxiliary signal comprises a stimulus.

In some embodiments, the auxiliary signal comprises a steady state visually evoked potential (SSVEP).

In some embodiments, the auxiliary signal comprises a light-source SSVEP.

In some embodiments, the auxiliary signal comprises an offset-onset SSVEP.

In some embodiments, the system further comprises a pattern reversal SSVEP.

In some embodiments, the signal of the nonlinear time-variant system is measured using a brain-computer interface EEG.

In some embodiments, the primary signal and the response to the auxiliary signal comprise a simultaneous combined response.

Additional advantages of the disclosed compositions and methods will be set forth in part in the description, which follows and, in part, will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed compositions and methods, as claimed.

BRIEF DESCRIPTION OF DRAWINGS

The details of one or more embodiments of the invention are set forth in the accompanying drawings and the description below. Other features, objects, and advantages of the invention will be apparent from the description and drawings and from the claims.

FIG. 3A shows an example method of detecting unobserved or unobservable signals from an observed signal via response coupling in accordance with an illustrative embodiment.

FIG. 3B shows an example method of training a classifier to detect unobserved or unobservable signals from an observed signal via response coupling in accordance with an illustrative embodiment.

FIGS. 4A and 4B show example methods of detecting, using a power spectral density-based detector, or a convolutional neural network-based detector, unobserved or unobservable signals from an observed signal via response coupling in accordance with an illustrative embodiment.

FIG. 4C shows an example method of training a classifier to detect ErrP signals from SSVEP signal via response coupling in accordance with an illustrative embodiment.

FIGS. 6D-6G depict an experimental setup with the electrode cap layout (FIG. 6D) and a subset of human subjects (FIGS. 6E-6G). FIGS. 6H-6K depict evidence of response coupling seen in sliding window Fourier transform at electrode Cz for two subjects. FIG. 6H and FIG. 6J show the spectrum for ErrP signals, while FIG. 6I and FIG. 6K show the spectrum for non-ErrP signals.

FIG. 7A depicts three paradigms for the elicitation of SSVEPs. FIG. 7B depicts a maze game with brightness as a step function. FIG. 7C depicts a test subject using the system of FIG. 7B using an EEG BCI cap. FIGS. 7D-7I depict combined spectra for ErrP and non-ErrP signals at O1 and O2 for SSVEP frequency 10 Hz. FIG. 7D shows PSD at O2 for non-ErrP. FIG. 7E shows PSD at O2 for non-ErrP. FIG. 7F shows PSD at O2 for ErrP. FIG. 7G shows PSD at O2 for ErrP. FIG. 7H shows a combined spectrum for ErrP and non-ErrP signals at O1. FIG. 7I shows a combined spectrum for ErrP and non-ErrP signals at O2. FIG. 7J shows PSD at P4 with O1 as a reference electrode. FIG. 7K shows PSD at P4 with O2 as a reference electrode.

DETAILED DESCRIPTION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.
Example System FIGS. 1A-D each shows an example system 100 (shown as 100a, 100b, 100c, 100d) that can detect unobserved and unobservable signals in a subject, or system, using an auxiliary, secondary signal measured via response coupling in accordance with an illustrative embodiment.

Figure 1A:
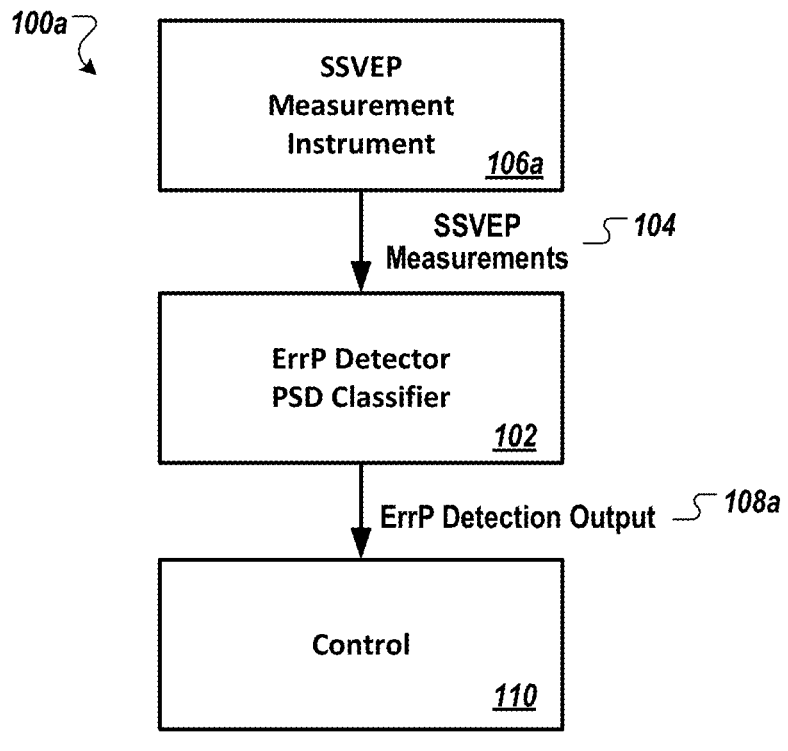
FIGS. 1A-D each shows an example system that can detect unobserved and unobservable signals in a subject, or system, using an auxiliary, secondary signal measured via response coupling in accordance with an illustrative embodiment.

In the example shown in FIG. 1A, the system 100a includes a power spectral density detector 102 configured to receive measurement 104 (shown as "SSVEP Measurements" 104) acquired via an instrument 106 (shown as "SSVEP Measurement Instrument" 106a) and determine the unobserved and unobservable signals 108 (shown as "ErrP Detection Output" 108a) from the measured signal 104 via a power spectral density-associated analysis. The determined unobserved and unobservable signals 106 can be used, e.g., in a human-in-the-loop (HIL) control 110 (shown as "Control" 110).

The measured signal has a simultaneous combined response in a subject with the unobserved signal or a response competition between competing observable and unobservable signals, or between observed and unobserved signals. Observable and observed signals refer to signals of high signal quality or available signals in an existing acquisition system. Unobservable and unobserved signals refer to high-cost signals, in that, the signal requires a specialized measurement instrument or setup that may not be readily available in a commercial or clinical environment, e.g., in a research or development environment. The signal can be acquired and thus used for training in such an environment to later then be deployed in a commercial or clinical setting.

In some embodiments, the measured signal was acquired while a display is contemporaneously presenting an observable error in the movement or action of a graphical element.

In some embodiments, the measured signal was acquired while a display is contemporaneously presenting an observable error in movement or action of a graphical element, e.g., during SSVEP acquisition.

The determined unobserved and unobservable signals 106 can be used, e.g., in a human-in-the-loop (HIL) control 110. In some embodiments, the outputted probability value of the presence of the unobserved signal, or a value derived therefrom (e.g., statistical characterization or a linear derivation), is employed as a human-in-the-loop control signal.

Figure 2:
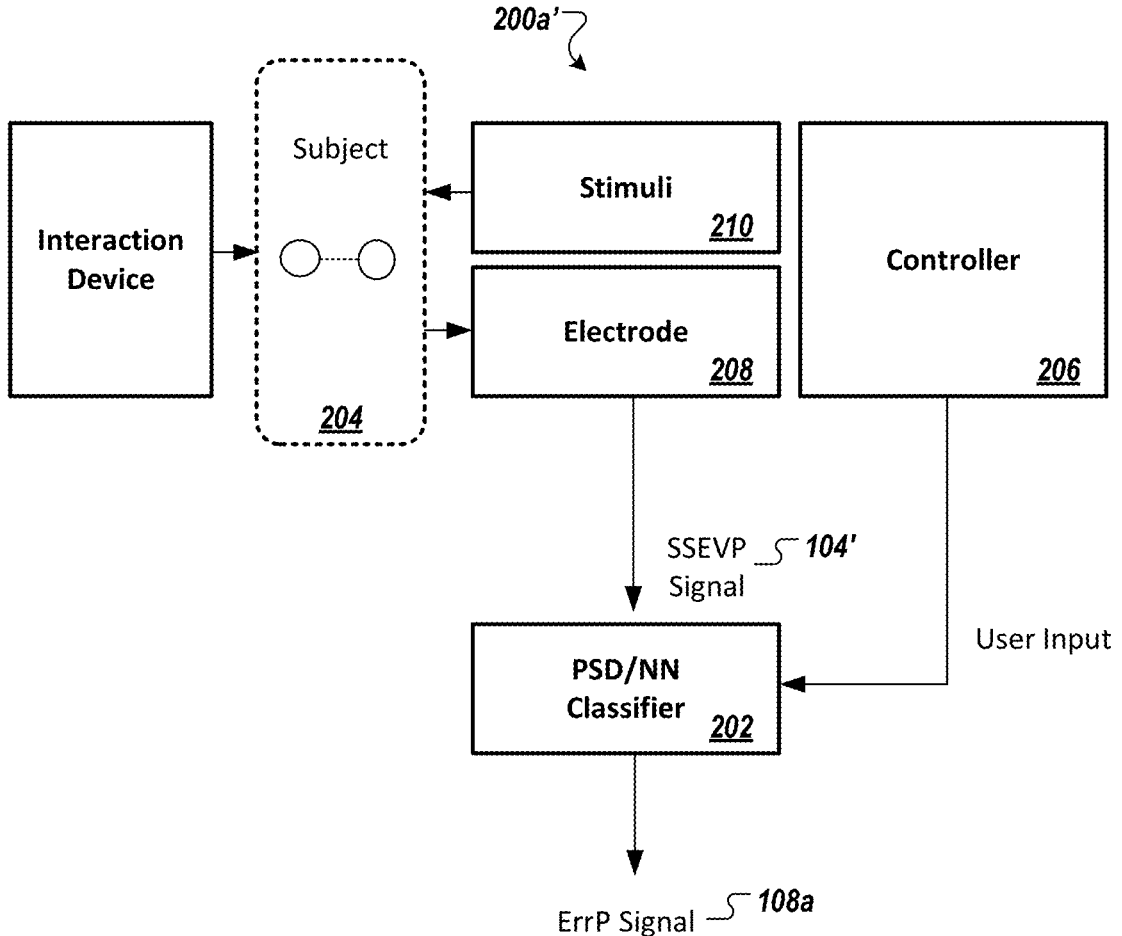
FIG. 2 shows an example implementation of the system for an ErrP detector using an SSVEP signal, in accordance with an illustrative embodiment.

In some embodiments, the outputted probability value of the presence of the unobserved signal, or a value derived therefrom, is employed as a human-in-the-loop input signal for an AI training system. The AI training system may be configured to generate a trained AI system for control of a robot or for control of a computing task.
Example ErrP Detector System and Method Using SSVEP Signals FIG. 2 shows an example implementation of the system 100a (shown as 100a') for an ErrP detector, e.g., of FIG. 1A, using an SSVEP signal, in accordance with an illustrative embodiment. In the example shown in FIG. 2, the system 100a' includes a classifier 202 (shown as "PSD/NN Classifier" 202), e.g., power spectral density detector or a neutral network, configured to receive measurement 104 (shown as "SSVEP Signal" 104') acquired via an instrument 106 of a subject 204 and determine the unobserved and unobservable signals 108 (shown as "ErrP Signal" 108a) from the measured signal 104'. In FIG. 2, instrument 106 includes a controller 206, electrode 208, and a stimuli source 210.

FIGS. 3A, 4A, and 4B show examples of the method 300, 400 (shown as 300a, 400a, and 400b, respectively) to employ the classifier 202.

FIG. 3A shows an example method 300 to detect unobserved and unobservable signals in a subject, or system, using an auxiliary, secondary signal measured from the subject while the unobserved and unobservable signals is known to be present. In the example shown in FIG. 3A, Method 300a includes receiving (302), by a processor, data of a measured signal (e.g., steady state visually evoked potential (SSVEP) signal). Method 300a includes determining (304), by the processor, a probability value of a presence or non-presence of an unobserved signal (e.g., ErrP signal, EEG) via a trained classifier, wherein the trained classifier was trained based on training data comprising a plurality of the measured unobserved signal acquired when the unobserved signal is present. Method 300a includes outputting (306) the probability value of the presence of the unobserved signal, or a value derived therefrom, wherein the probability value is employed in a control or a diagnostic operation.

In some embodiments, the outputted probability value of the presence of the unobserved signal, or a value derived therefrom, is employed as a human-in-the-loop control signal. An example of a human-in-the-loop control signal is provided in Xu, Duo, et al. "Accelerating Reinforcement Learning using EEG-based implicit human feedback." Neurocomputing 460 (2021): 139-153, in using ErrPs to improve the training of Reinforcement learning algorithms. Another example of a human-in-the-loop control signal are provided in Salazar-Gomez, Andres F., et al. "Correcting robot mistakes in real time using EEG signals." 2017 IEEE international conference on robotics and automation (ICRA). IEEE, 2017, in using ErrPs to correct a robot's mistakes in real-time. ErrP can have a response time of 1 ms or less and have applicability in real-time operation.

Various instruments may be used in the commercial embodiment, or research/development environment. The instrument 106 may be a brain-computer interface (BCI) device, in some embodiments. An example instrument 106 may include, but is not limited to, EEG electrode cap system (e.g., BioNomadix wireless EEG cap system by Biopac Systems, Inc., Goleta, California), wireless EEG headset system (e.g., Epoc by Emotiv, San Francisco, CA), Brain sensing headband (e.g., Cyton+Daisy Biosensing Boards by OpenBCI), among other instrument described or referenced herein.

EEG Cap System. EEG electrode cap may include fabric cap having recessed tin electrodes attached to a fabric (e.g., Lycra-type fabric). The electrodes may be pre-positioned in the International 10-20 montage for unipolar or bipolar measurement, e.g., for evoked potential measurements. The electrode cap may be connected to an electroencephalogram amplifier and wireless transmitters/receivers.

Wireless EEG Headset. The instrument may be a high-resolution, multi-channel, portable EEG headset system having sensors that can measure at locations AF3, AF4, F3, F4, FC5, FC6, F7, F8, T7, T8, P7, P8, O1, O2 (according to 10-20 International standards), e.g., with 14-16 bits per channel, at 0.5 µV or 0.1 µV. The headset may operate with an eye-tracking device and may include quaternions, accelerometers, and magnetometers.

Brain sensing headband. The instrument may be a high resolution, multi-channel, portable EEG headset system having sensors that can measure at locations AF7, AF8, TP9, and TP10 (according to 10-20 International standards), e.g., with 500 Hz, 10 or 16-bit sampling.

Brain sensing headband. The instrument may be an Arduino-compatible, multi-channel (e.g., 16-channel) neural interface with a 32-bit microcontroller. The system may measure up to 16 channels of brain activity (EEG), muscle activity (EMG), and heart activity (ECG).

Example Unobserved-Signal Neural-Network Detector

FIG. 4A shows an example step 304 (shown as 400a) to determine a probability value of the presence or non-presence of an unobserved signal via a classifier trained per FIG. 3A. Method 400 includes generating (402) (i) a first band signal having frequency range from a first frequency to a second frequency of an observed signal, (ii) a second band signal having frequency range from the second frequency to a third frequency of the observed signal, (iii) a third band signal having frequency range from the third frequency to a fourth frequency of the observed signal. Method 400 then includes providing (404) the first band signal, the second band signal, the third band signal, and a source signal of the first band signal, the second band signal, and the third band signal to a trained classifier. Method 400 then includes determining (406) the probability of presence or non-presence of an un-observed signal via the trained classifier.

In some embodiments, the measured signal is acquired as a physiological response to a stimulus (e.g., light stimulus).

In some embodiments, the measured signal comprises an offset-onset SSVEP signal or a pattern reversal SSVEP.

In some embodiments, the measured signal is acquired via a brain-computer interface (BCI).

In some embodiments, the measured signal has a simultaneous combined response in a subject with the unobserved signal.

FIGS. 5A-5E shows an example method to determine a probability value of a presence or non-presence of ErrP signal as the unobserved signal via a classifier trained using SSVEP signal. In the example shown in FIG. 5A, Method 400 includes generating a low-band signal (504) having frequency components from 1 Hz to 4 Hz from an acquired SSVEP signal (502), a mid-band signal (506) having frequency components from 4 Hz to 8 Hz from the SSVEP signal 502, and a high-band signal (508) having frequency components from 8 Hz to 25 Hz, from the SSVEP signal 502.

Figure 5A:
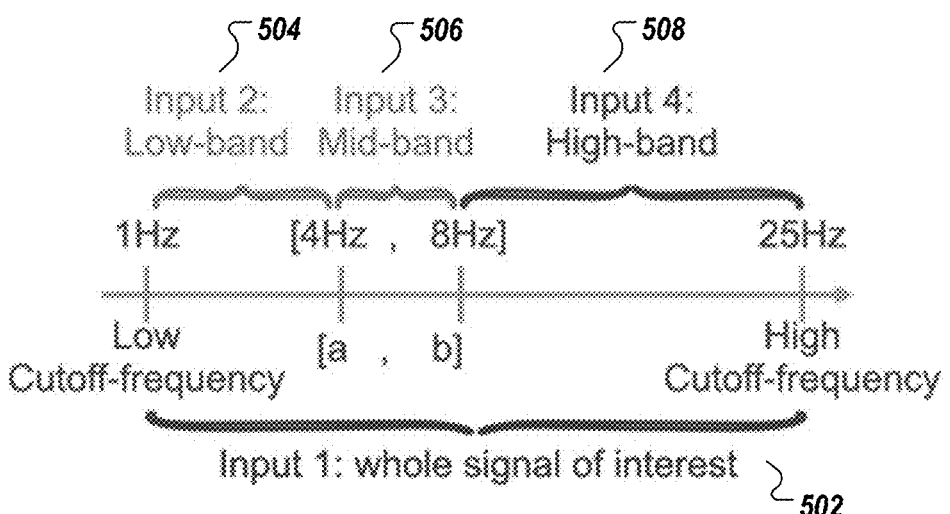
FIGS. 5A-5F shows an example method and performance to determine a probability value of a presence or non-presence of ErrP signal as the unobserved signal via a classifier trained using SSVEP signal.
Figure 5B:
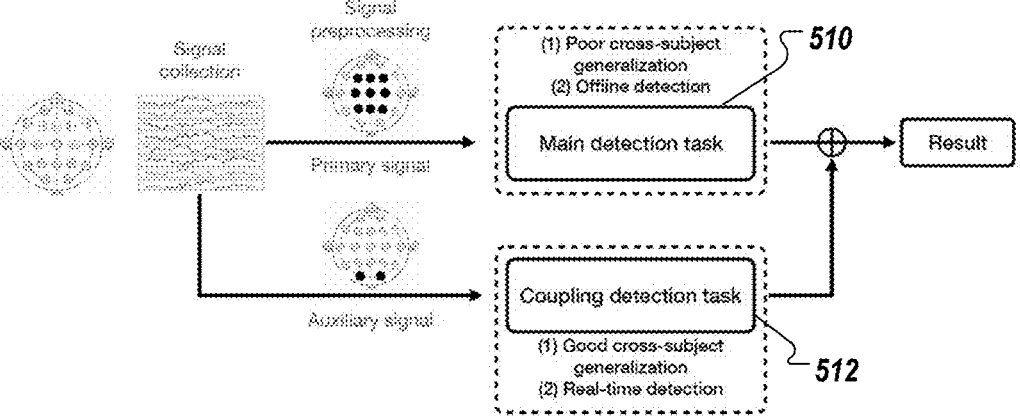

The SSVEP signal 502 may be preprocessed (scaled and filtered) from the acquired signal, e.g., to have a frequency range from 1 Hz to 25 Hz. The low band signal (502), the mid band signal (504), and the high band signal (506) may be generated using a bandpass filter. FIG. 5B shows the sub-band signals (502, 504, 506, 508) being used as direct input to a convolutional neural network.

Example Unobserved-Signal Probability Density Detector

FIG. 4B shows an example step 304 (shown as 400b) to determine a probability value of a presence or non-presence of an unobserved signal via a PSD classifier trained per FIG. 3A. Method 400b includes generating (408) probability density distribution curve from difference between first and second window at a signal frequency of an observed signal. Method 400b then includes determining (410) probability value of the presence or non-presence of an un-observed signal via a Bayesian classifier. In some embodiments, Method 400b may include generating (412) averaged probability score from a composite model.

In some embodiments, the measured signal is acquired as a physiological response to a stimulus (e.g., a light stimulus).

In some embodiments, the measured signal comprises an offset-onset SSVEP signal or a pattern reversal SSVEP.

In some embodiments, the measured signal is acquired via a brain-computer interface (BCI).

In some embodiments, the measured signal has a simultaneous combined response in a subject with the unobserved signal.

Figure 6A:
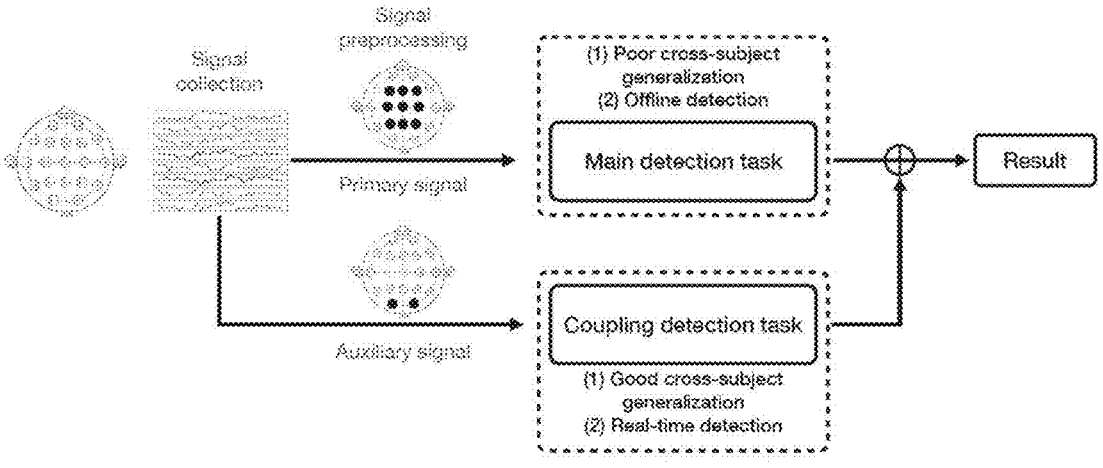
FIG. 6A depicts a framework for response coupling evaluation employed in a study using a primary and an auxiliary signal.
Figure 6B:
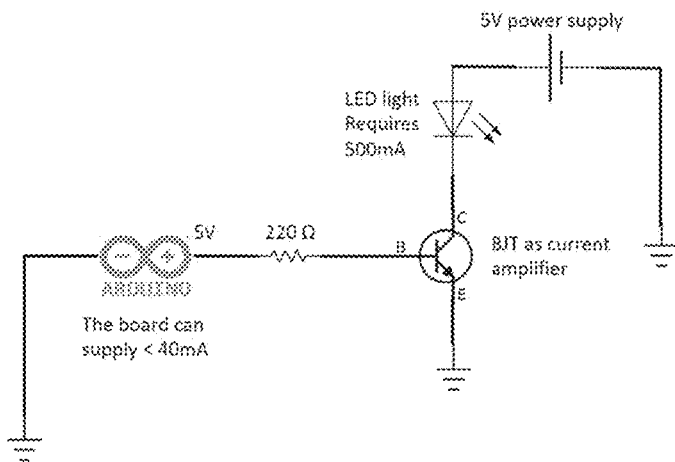
FIGS. 6B-6C depict two possible setups for the system.
Figure 6C:
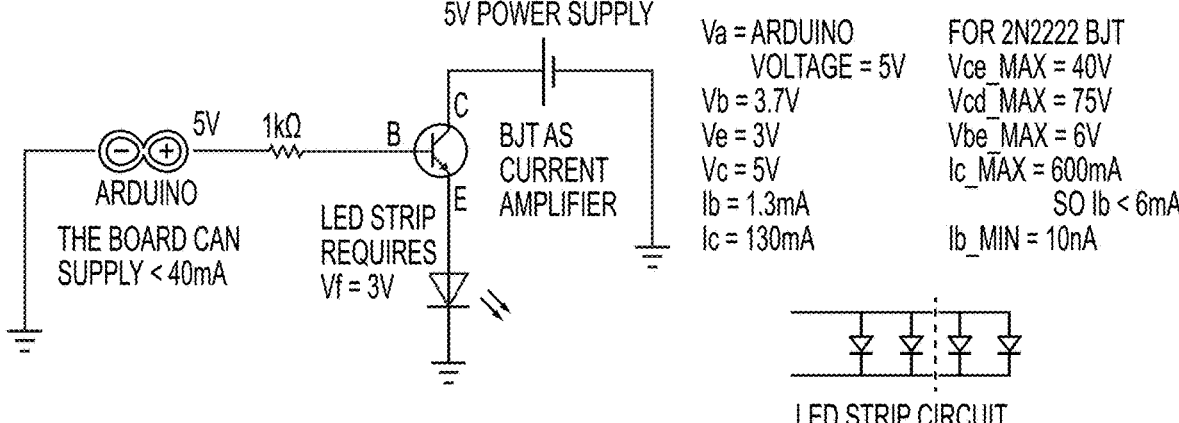
Figures 6L, 6M, 6N:
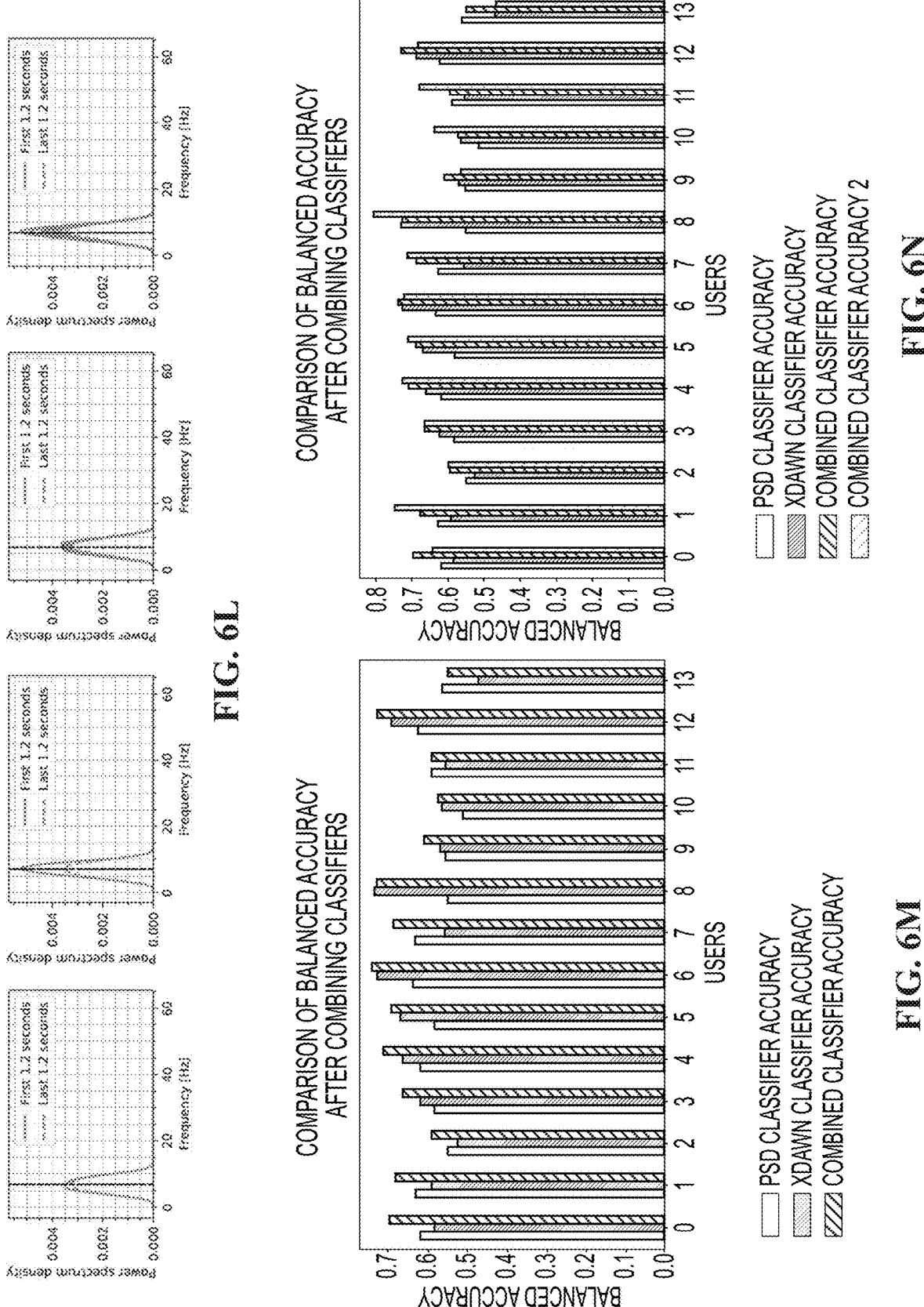
FIG. 6L depicts spectra for non-ErrP and ErrP signals at Cz and all electrodes for the SSVEP frequency.
FIGS. 6M-6N depicts comparisons of balanced accuracy after combining classifiers.

FIGS. 6A-6N shows an example method to determine a probability value of a presence or non-presence of ErrP signal as the unobserved signal via a trained PSD classifier using SSVEP signal.

In some embodiments, a probability density distribution curve is created based on the difference between the PSD for the first and the last window at the SSVEP frequency, using the training samples. Based on the distribution, a Bayesian decision boundary can be determined and pass through a sigmoid function to create a Bayesian classifier, e.g., that outputs the probability that a given sample is an ErrP or not. In some embodiments, the probabilities of the PSD classifier can be averaged with that of a second classifier (e.g., Xdawn+tangent space classifier) to create a composite model (e.g., FIG. 6O).

A study described herein was conducted that demonstrate an experiment with 7 Hz SSVEP and ErrP signals.

Welch Operation. In some embodiments, the Welch method can be employed that segment each signal into K overlapping windows. To perform the Welch operation, Fourier transform of each segment can be squared to provide the PSD. All segments can then be averaged.

Method to Generate a Trained Classifier

FIG. 3B shows an example method 350 to generate a trained classifier, e.g., the PSD classifier, the neural network classifier, or others. In the example shown in FIG. 3B, Method 350 includes introducing (352) a subject-to-test system that invokes or solicits periods of unobserved signal in the subject. Method 350 then includes acquiring (354) measured signals during the presence of an unobserved signal. Method 350 then includes training (352) a classifier using the measured signal to provide output for the presence or non-presence of the unobserved signal.

FIG. 4C shows an example method of training a classifier to detect ErrP signals from SSVEP signal via response coupling in accordance with an illustrative embodiment. In FIG. 4D, Method 450 includes generating (452) (i) a first band signal having frequency range from a first frequency to a second frequency of an observed training signal, (ii) a second band signal having frequency range from the second frequency to a third frequency of the observed signal, (iii) a third band signal having frequency range from the third frequency to a fourth frequency of the observed signal. Method 450 then includes providing (454) the first band signal, the second band signal, the third band signal, and a source signal of the first band signal, the second band signal, the third band signal as input to a classifier, the ground truth being an input associated with presence of an observed signal (e.g., see FIG. 5C). Method 450 then includes training (456) the classifier.

The PSD or NN classification engine, e.g., as described in relation to FIGS. 1A, 1B, 1C, 1D, 2A, 3A, 3B, 4A, 4B, and 4C can be implemented using one or more artificial intelligence and machine learning operations. The term "artificial intelligence" can include any technique that enables one or more computing devices or computing systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers, such as an input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., an error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, and depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by down sampling). A fully-connected layer includes neurons, where each neuron is connected to all of the neurons in the previous layer. The layers are stacked similar to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., error such as L1 or L2 loss), during training. This disclosure contemplates that any algorithm that finds the minimum of the cost function can be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Example Coupling Response Between SSVEP Signals and ErrP Signals

FIGS. 5A-5E shows an example method to determine a probability value of the presence or non-presence of the ErrP signal as the unobserved signal via a classifier trained using SSVEP signal. In the example shown in FIG. 5A, Method 400 includes generating a low-band signal (504) having frequency components from 1 Hz to 4 Hz from an acquired SSVEP signal (502), a mid-band signal (506) having frequency components from 4 Hz to 8 Hz from the SSVEP signal 502, and a high-band signal (508) having frequency components from 8 Hz to 25 Hz, from the SSVEP signal 502.

Convolutional neural network (CNN) can be used for its generalizability in multiple EEG paradigms. The CNN can be used in a decoupled detection framework that can operate on disjointed signals of interest, e.g., between ErrP and SSVEP, which have fundamental differences from each other. For example, EEGNet_multiband can be employed in main task detection (510), and EEGNet_SSVEP is used for coupling task detection (512). The data augmentation of FIG. 5A can be used to separate the task of learning the temporal and spectral characteristics between (1) ErrP+SSVEP, (2) non-ErrP+SSVEP, and (3) pure SSVEP in a pre-defined time window (e.g., 3-second time window).

Figure 5C:
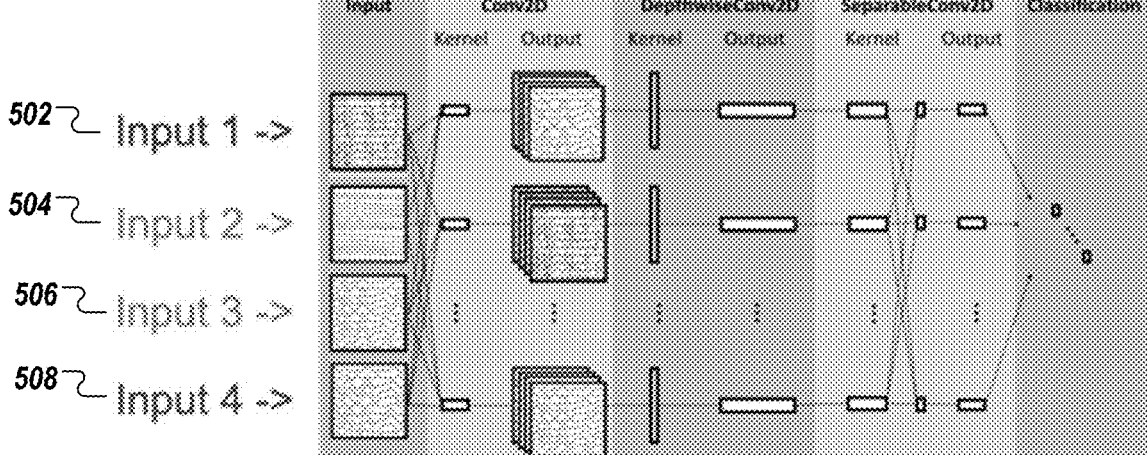

FIG. 5C shows data augmentation and model architecture for EEGNet_multiband (e.g., 510). As shown in the example of FIG. 5C, the input includes four separate sets of time-series data (502, 504, 506, 508). The first input (502) is the original full-band signal. The second to the fourth inputs (504, 506, 508) correspond to the low-band (fl to a Hz), mid-band (a to b Hz), and high-band (b to fh Hz) signals while a and b are tunable hyperparameters.

Figure 5E:
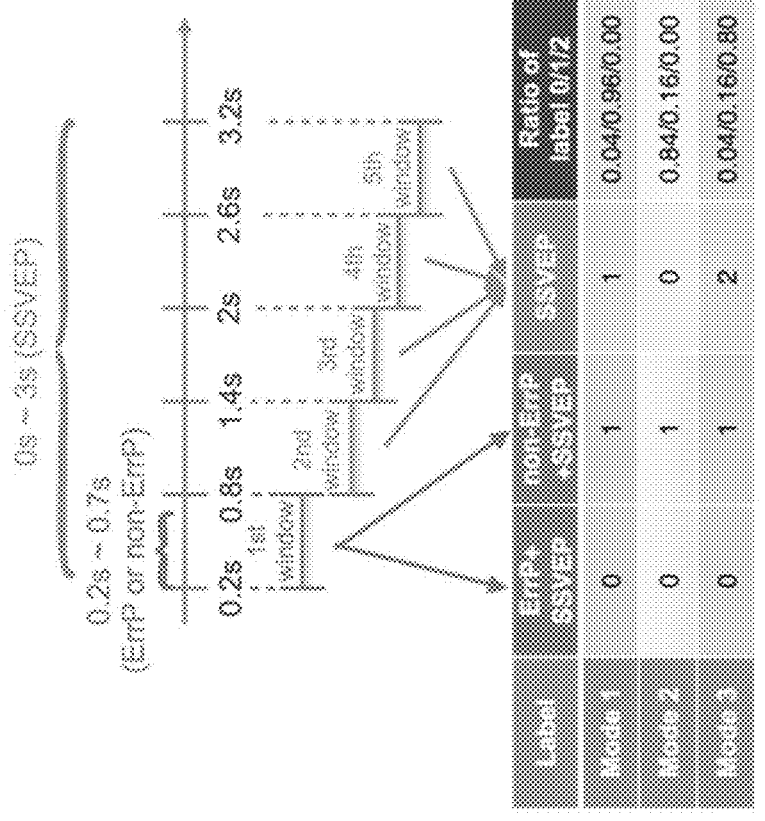
Figure 5D:
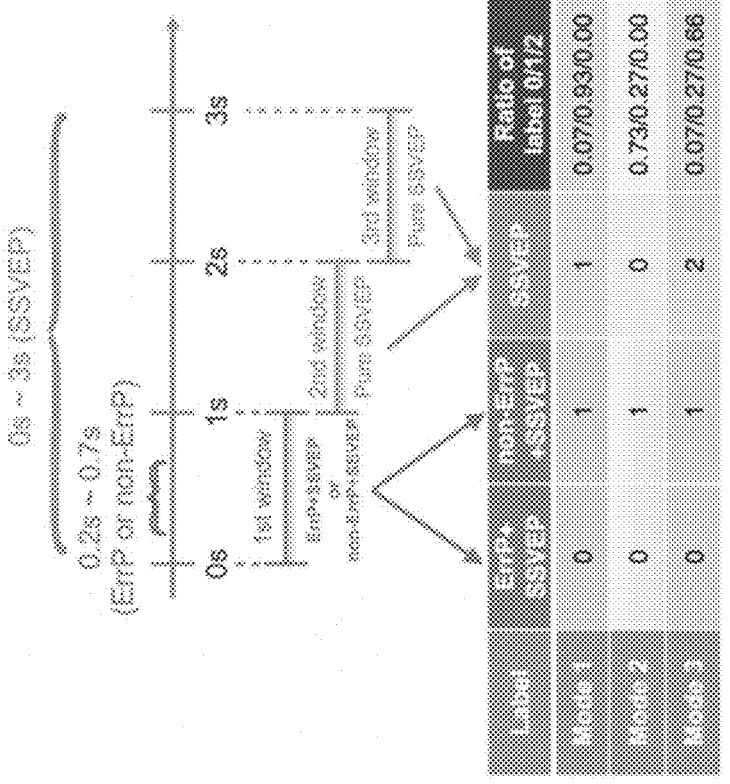

FIGS. 5D and 5E shows example data augmentation and model architecture for EEGNet_SSVEP (e.g., 512). In the EEGNet_SSVEP model (512), the data can be augmented in two orthogonal ways: one from the manipulation of window length and the other from the annotation of the label. For the manipulation of window length, since SSVEP is a repeating signal, a longer window size could be employed to enhance the SNR and, hence, the intensity of SSVEP. Because longer window size can also reduce the available sample size (important for CNN-based models like EEGNet) and can also dimmish the portion of ErrP segment (dominant within 0.2 s to 0.7 s with respect to the activation time at 0 s) compared to the length of each window, the method may segment the signal into the window. In some embodiments, the method can include dividing the 3-second window into three 1-second windows, with the first segment containing ErrP/non-ErrP mixed with SSVEP, while the last two segments contain only pure SSVEP. In alternative embodiments, the second division can be done by splitting the 3-second window into 6 sub-windows, each with a length of 0.6 seconds.

Figure 5F:
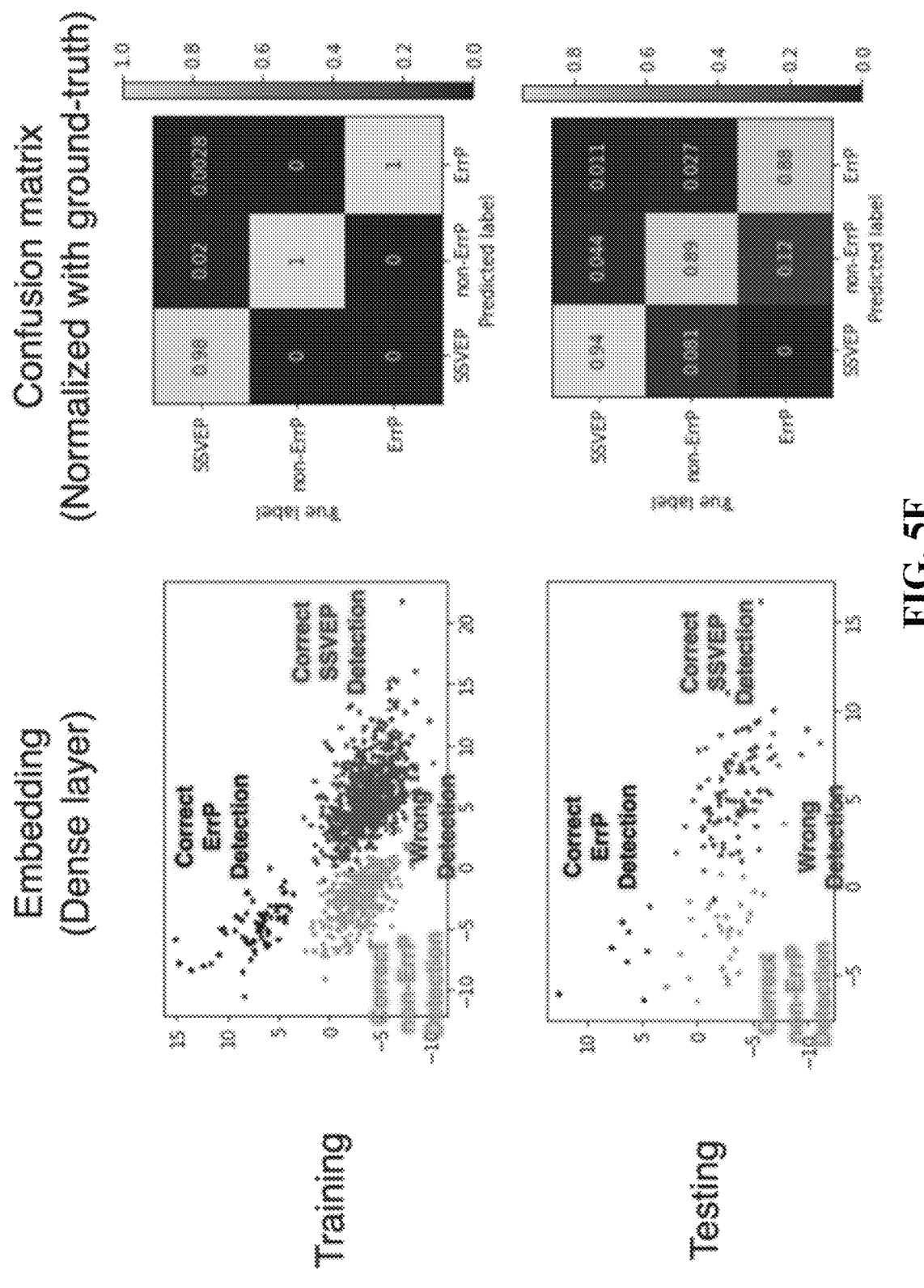

FIG. 5F shows an example embedding of a hidden layer (the dense layer) obtained from the EEGNet_SSVEP model. In FIG. 5F, it can be observed that non-ErrP is located between SSVEP and ErrP but is much closer to SSVEP than ErrP. In FIG. 5F, SSVEP exists all the time throughout the experiment, which means that even the ErrP and non-ErrP data points contain SSVEP signals. However, through the embedding in FIG. 5F, it can be observed that when ErrP is presented, SSVEP is much more interfered with, making it located far from the pure SSVEP data points. In comparison, non-ErrP slightly impacts the SSVEP and hence is located close to SSVEP data points. Such observation explains why detecting SSVEP itself also helps the detection of ErrP.

SNR Analysis from PSD. In some embodiments, signal-to-noise (SNR) calculations at the center frequency (f0) can be performed as the ratio of PSD at f0 divided by the PSD of its N neighbours.

PSD Correlation Analysis. In some embodiments, the system can find the correlation between the SSVEP frequency and its first harmonic can help determine if an increased intensity at the SSVEP frequency is due to the SSVEP or other factors. The PSD correlation between the two frequencies and their r-squared values can be calculated.

Engineering and Other Clinical Examples

The present disclosure provides an analysis of response coupling via PSD classifier and NN classifier that can be applied to engineering systems.

An auxiliary signal can be chosen for an engineering system signal that is readily observable via sensors, e.g., acoustic, thermal, optical, vibration, and pressure. To be an auxiliary signal for response coupling, the engineering system signals have at least one property of being (i) detectable and decodable, (ii) elicited simultaneous the unobservable or unobserved signal of interest, and (iii) have coupled interactions.

Detectable and Decodable. The auxiliary signal should be detectable and decodable either in terms of model complexity or in terms of accuracy and is also efficient or straightforward to observe or measure. Efficient or straightforward observation or measurement refers to the signal being decodable with high accuracy with little or no difficulty. In some embodiments, the models required to detect this signal do not need to be recalibrated for seen/unseen data. In some embodiments, the signal response does not vary significantly across variables like time, tasks, environments, people, etc., and thus does not present enough difficulty in designing models for its detection. In some embodiments, the signal elicited has a high SNR. In some embodiments, the signal has high temporal, spatial, or frequency resolution compared to another signal, which simplifies its decoding.

Simultaneous elicitation. The signal should be able to be elicited/produced simultaneously in the system with the primary signal (the difficult-to-detect signal). Thus, a signal that cannot co-exist with the primary signal is disqualified to be an auxiliary signal.

Coupled Interaction. There exists an interaction between the auxiliary signal and the primary signal when they co-exist, which manifests itself as a change in the properties of the primary and/or auxiliary signal. The term property can refer to one or more of the signal amplitude, frequency spectrum, latency behavior, SNR, etc.

Figure 1B:
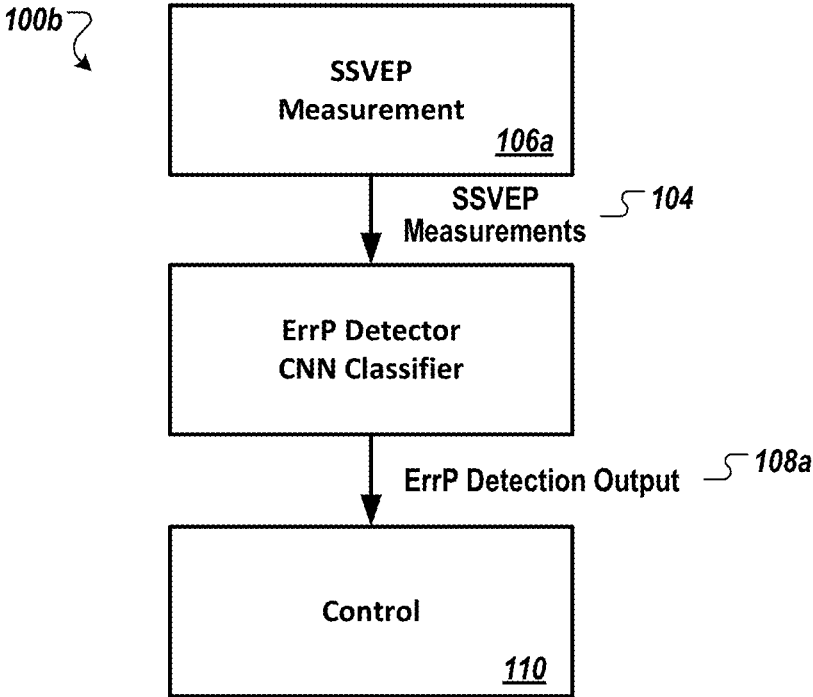
Figure 1C:
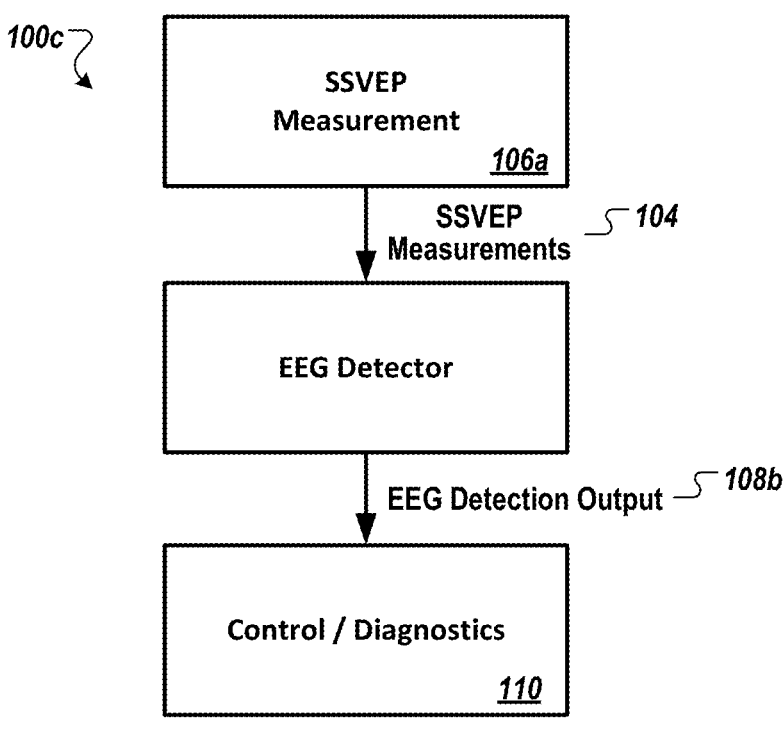
Figure 1D:
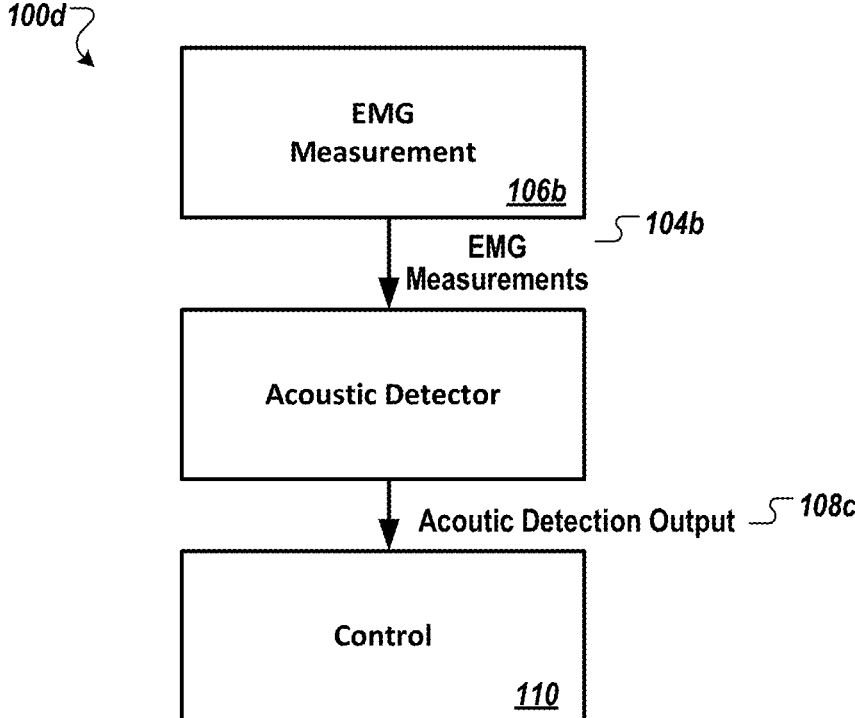

FIGS. 1B-1D each show examples system 100b-100d that can detect unobserved and unobservable signals in a subject, or system, using an auxiliary, secondary signal measured via response coupling in accordance with an illustrative embodiment.

In the example shown in FIG. 1B, the system 100b includes a power spectral density detector or NN detector (e.g., 102) configured to receive measurement 104 (shown as "SSVEP Measurements" 104) acquired via an instrument 106 (shown as "SSVEP Measurement Instrument" 106a) and determine the unobserved and unobservable signals 108 (shown as "ErrP Signal" 108a) from the measured signal 104. The determined unobserved and unobservable signals 106 can be used, e.g., in a human-in-the-loop (HIL) control 110 (shown as "Control" 110).

In the example shown in FIG. 1C, the system 100c includes an EEG detector, based on PSD detector or NN detector, configured to receive measurement 104 (shown as "SSVEP Measurements" 104) acquired via an instrument 106 (shown as "SSVEP Measurement" Instrument 106a) and determine the unobserved and unobservable signals 108 (shown as "EEG Detection Output" 108b) from the measured signal 104. The determined unobserved and unobservable signals 106 can be used, e.g., in a human-in-the-loop (HIL) control 110.

In the example shown in FIG. 1D, the system 100d includes an acoustic (EMG) detector, based on a PSD detector or NN detector, configured to receive measurement 104 (shown as "EMG Measurements" 104b) acquired via an instrument 106 (shown as "EMG Measurement" Instrument 106b) and determine the unobserved and unobservable signals 108 (shown as "Acoustic Detection Output" 108c) from the measured signal 104. The determined unobserved and unobservable signals 106 can be used, e.g., in a human-in-the-loop (HIL) control 110 (shown as "Control" 110).

Wireless systems. In a scenario where the wireless channel varies very rapidly and has low SNR, the transmitted signal by the base stations and the user equipment can be considered as a primary signal and can be paired with easier-to-detect auxiliary signals to simplify their detection.

Acoustic signals in noisy environments. Given that sound signals in noisy environments can produce low SNR, acoustic signals can be treated as primary signals in this environment and can be paired with auxiliary signals that are not affected by neighboring noise levels (one example of this auxiliary signal is the EMG signal from a person's jaw) to simplify their decoding. The primary signal here (sound produced by a person) interacts with the auxiliary signal and produces changes in it (in the EMG signal), and using this EMG, the exemplary can decode the acoustic signal even in the presence of noise, e.g., using the exemplary method and system described herein.

Seismic systems. Seismic signals can be very noisy due to background activity from various components of the system and thus can be a primary signal. The auxiliary signal for this system can be any signal whose properties are changed by the seismic signal but which is immune to the noise produced by the neighboring components.

Weather systems. Detecting weather signals, such as temperature, humidity, and atmospheric pressure, in meteorological forecasting can be challenging due to variations in weather patterns, sensor calibration issues, and atmospheric disturbances. They can be primary signals, and the choice of auxiliary signal can be made based on whether a signal is resilient to weather patterns and environmental disturbances. For instance, instead of directly measuring a primary signal (say, altitude), another easier signal (pressure) can be measured whose properties are changed by the primary signal, e.g., using the exemplary method and system described herein.

Spectroscopy. The exemplary method can also be applied to spectroscopy to measure the chemical composition of distant stars. Directly measuring this quantity is extremely difficult, so light that interacts with the target matter can be used. This interaction can be studied to infer information about the properties and composition of distant objects, e.g., using the exemplary method and system described herein.

This can be applied to similar apparatus such as oximeters, fNIRS, thermal imaging, etc.

SONAR. This method can also be applied to SONAR. It is difficult to measure the depth of a water body since the depth of water changes the properties of emitted sound waves (like reflection time). By studying these changed properties of emitted sound, the depth of a point can be measured, e.g., using the exemplary method and system described herein.

Doppler. Finally, this method can also be applied to the Doppler effect. The speed of approaching or receding stars is difficult to measure, but this can be estimated using another property (Doppler shift of light reflected from them) of light that interacts with them, e.g., using the exemplary method and system described herein.

EXPERIMENTAL RESULTS AND ADDITIONAL EXAMPLES

Example #1—Response Coupling: A New Paradigm for Detecting Elusive Brain Signals A study was conducted that relied on data-intensive methods that provide a general-purpose paradigm for detecting a hard-to-detect and elusive primary brain signal by using an easier-to-detect auxiliary signal. The study refers to the phenomenon as "response coupling" and exploits the perturbation in the auxiliary signal due to its interaction with a primary signal in inferring information about the primary signal. The study also used the terms "weak" and "hard-to-detect" interchangeably throughout this paper. The study evaluated evoked potentials and artifacts (e.g., eye-blinks) to develop a detector for error potential (ErrP) using steady-state visually evoked potential (SSVEP) as an auxiliary signal.

The study developed the mathematical and biological basis for this paradigm and experimentally demonstrated evidence for response coupling in the setup. The study also evaluated the exemplary method against the state-of-the-art methods on datasets collected in the lab as well as a public dataset.

Background Brain-computer interfaces (BCIs) can provide a communication channel between the user and the outside world without needing explicit effort from the user. In spite of the enormous promise BCIs hold for varying applications, they are yet to become a mainstream communication modality. Some of the reasons for this include a very poor signal-to-noise ratio, lower signal resolution, lack of signal generalization, etc. The brain is a non-linear dynamic system whose response also varies with factors like time, attention, environment, etc., which makes its modeling challenging and thereby makes the detection of certain brain signals difficult and unreliable. Most solutions to this problem that are algorithmic or involve signal processing either rely on data-intensive methods or end up being very task-specific.

Brain-Computer Interfaces, or BCIs, allow for a direct communication pathway between the brain and an external computing device. By tapping directly into the brain, the seat of all thoughts and actions, BCIs bypass many limitations of traditional human-computer interaction (HCI) that require physical activity like pressing buttons on a keyboard, giving commands using speech, etc. Historically, BCIs have mostly been used in medical settings, but recent research has greatly enabled BCI usage in other mainstream domains such as security [1], entertainment [2], and interactive applications like VR and robot control [3, 4]. With the commoditized availability of portable BCI headsets, they have clearly emerged as a promising avenue for human communication with computing devices. The global brain computer interface device market size was valued at $1.4 billion in 2020 [5] and $2.8 billion in 2022 and is projected to surpass $9.31 billion by 2030 [6].

Typically, BCI systems need three components for their operation. First, they require sensing, wherein one or more sensors (e.g., electrodes on BCI caps) measure the activity in the brain. Second, they require models that process this brain activity and decode the user's intent. Finally, they require a system that is responsible for acting upon the interpreted intent (e.g., an actuator for a robot control system, a software system for a VR application, etc.).

Broadly speaking, BCIs can be divided into two major categories: invasive BCIs and non-invasive BCIs. Invasive BCI refers to a system where sensors and electrodes are surgically placed inside a subject's scalp or grey matter, whereas non-invasive BCI refers to a system where the electro-chemical activity in the brain is externally recorded from the scalp. While invasive BCI methods provide better signal resolution quality, they also require risky procedures for their insertion, which makes them unattractive for non-medical applications. Non-invasive BCIs, on the other hand, measure brain activity conveniently from the scalp or other external areas. Due to their user-friendliness, non-invasive BCIs are overwhelmingly popular compared to invasive BCIs and had over 86% of the BCI market share in 2021 [7].

Within non-invasive BCIs, there are different methods to record a user's brain signals, including EEG (Electroencephalography), MEG (Magnetoencephalography), NIRS (Near Infra-Red Spectroscopy), etc. While each of these techniques has its own respective utility, EEG remains by far the most popular method, arguably because it lies in a unique sweet spot of cost-effectiveness, portability, and user-friendliness [8]. As of 2016, EEG-based research accounted for 71.2% of all research on BCI systems [9] and as of 2021, also accounted for 73.3% of the global BCI market [7]. Thus, the focus of this study is on non-invasive BCIs, specifically those that rely on the detection of EEG signals.

Despite the promise of EEG as a crucial enabling technology for BCIs, it is still not close to being a mainstream modality for everyday human-computer interactions. Systems designed for EEG typically suffer from low signal-to-noise ratios, among other challenges, which makes its detection and classification difficult. Over the years, multiple solutions along varying dimensions have been proposed to combat this challenge. While spatial filtering and machine learning approaches have shown promise, they have a ceiling in terms of how much they can improve performance. This ceiling is imposed by the very intrinsic nature of EEG. As EEG represents brain activity externally, not only does the thickness of the scalp attenuate the signal, but the difference in conductivity between the brain, the skull bone, and the scalp changes its fundamental characteristics [10]. This, coupled with the low spatial resolution of EEG, results in a sizeable amount of interference manifesting itself as noise.

Many types of EEG signals of interest for HCIs suffer from the low signal-to-noise ratio problem, which is referred to as weak signals. Examples of weak signals include event-related potentials (ERPs) that typically have lower detection rates, e.g., ErrPs-error-related evoked potentials have a balanced detection accuracy of about 60-70% (this is dependent on datasets as well; detailed accuracy numbers are provided later in this study). However, certain types of EEG signals exist that are inherently strong and hence detectable with significantly higher performance. These strong signals are quite commonly relied upon for medical applications. Examples of strong signals include steady-state visual evoked potentials (SSVEPs), reactions to eye blinks, etc. Strong signals like SSVEP can be detected with more than a 90% balanced accuracy.

The instant study evaluated whether the detection accuracy for weak EEG signals can be amplified by leveraging some aspects of strong EEG signals. Such an approach of combining strong and weak signals is analogous to how, in wireless communication, a strong carrier signal is modulated with an otherwise weak information signal to increase the signal-to-noise ratio for the information signal. This paradigm of intelligently combining weak and strong signals is referred to as "response coupling," wherein the detection accuracy for weak signals of interest that are otherwise noisy and elusive is amplified by being considered in tandem with strong signals (that are either artificially stimulated or are naturally occurring). Specifically, the instant study considered ErrPs as the weak signal of interest and relied on SSVEPs, an easily-detectable signal, as the enabling strong signal. ErrPs are evoked potentials that are caused by perceived errors around a human observer and thus have tremendous applications in any human-in-the-loop (HITL) cyber-physical system. While the instant study elaborated on a comprehensive set of use cases for ErrPs, an example would be a HITL where an agent that relies on reinforcement learning uses ErrPs from a human observer as a reward-shaping function to accelerate its learning. Using IRB-approved experimental user studies, this study validates that response coupling shows significant promise as an approach to amplify detection accuracy for weak signals. Thus, the key research contributions of this study are as follows:

BCI History and Error Potentials. Enterprising research on BCIs started flourishing in the 1970s when many researchers worked on establishing direct brain-to-machine communication [11]. In 1973, a Belgian researcher, Jacques C. Vidal, talked about "evoked potentials," which were variations in brain activity as a response to a specific sensory stimulus or event. Research on evoked potentials, also synonymously used with "Event-Related Potentials" (ERP), gained momentum in the '80s. In 1988, Farwell demonstrated that subjects could communicate 12 bits per minute without talking, using the P300 ERP in his paper, "Talking off the top of your head" [12]. In 1991, Wolpaw presented a system to mentally control a cursor using the 8-12 Hz u-frequency band [13]. In the same year, Falkenstein showed the presence of the "Error Potential" or ErrP in humans when they detected that an error had been committed in an experimental trial [14]. ErrPs are a measure of the brain detecting/processing an error (for instance, seeing a robot perform a task incorrectly). ErrPs are extremely valuable for BCI applications as they provide a generalized notion of error detection in a diverse set of tasks across a wide variety of input modalities (e.g., audio [16], visual [17], somatosensory [18], etc.). ErrPs have a lot of promise and have been used in applications for improving the performance and reliability of BCI spellers [19], correcting and adapting AI systems, as well as aiding in learning for AI agents like correcting a robot's mistakes and accelerating learning for a reinforcement learning agent [21]. However, their detection accuracy is usually poor as, firstly, the ErrP activity is minute (order of μV), and this signal not only has to pass through layers of the skull, scalp, muscle, etc., consequently getting attenuated but also gets corrupted by interference and noise from nearby neural activity. Secondly, the human brain exhibits a lot of variance across users, tasks, environments, etc., so a model trained on one user w.r.t. a specified task does not generalize well to another user or task. This makes reliable detection and generalization of ErrPs a fundamental challenge and forms our problem statement.

Notable works addressing similar challenges include enhanced spatial filtering techniques [22], optimal channel selection [23], independent component analysis, and Laplacian filter-based methods [24]. Machine learning models to clean artifacts and neural nets to enhance BCI performance are also used [25]. Hybrid BCI systems where two or more signal paradigms are combined to yield better performance are also used, [26] combined EEG and NIRS and observed enhanced classification of motor imagery signals, while [27] utilized SSVEP signals to complement P300 signal detection and classification accuracy, [28] used the characteristics of SSVEP signals to gauge the power of other ERP signals. Similar to BCIs in general, ErrPs have also been traditionally detected using spatial filtering techniques where accuracy ranges between 60-65% [29]. More recently, Reimannian-geometry-based methods have been very successful and have improved accuracy to about 75% [30]. ConvNet also showcased the potential of shallow deep-learning models to classify and generalize EEG signals [31] using very few parameters (91,602). With EEGNet [32], the study brought the parameters further down to 1082 or 2290 (depending on the configuration), and this showed promising numbers for ErrP detection (these approaches, however, achieved accuracies in the low 60s on the datasets used in the instant study). Brain signals are hard to obtain because collecting BCI data involves long and controlled sessions in a lab environment, which makes this process burdensome. Brain signals are also very susceptible to even slight movements, which corrupt entire datasets. Furthermore, since the human brain shows a lot of variance [33] w.r.t. the environment, task, user, etc., the data collected under a specific set of scenarios often does not generalize well to other scenarios, which makes models trained on them extremely specific with poor generalization abilities. Therefore, methods would be beneficial if it not only work on limited labeled data but are also resilient to changes in physiological and other factors, thus providing a notion of independence.

Response Coupling. "Response coupling" is defined as an algorithmic paradigm that can be used to simplify the detection of a noisy or hard-to-detect signal. It is based on the idea that coupling a strong auxiliary signal with a weak primary signal introduces changes that are easier to measure than the primary signal itself. It is analogous to the concept of mutual information in Information Theory, which measures how much a random variable tells us about another random variable. Response coupling also takes inspiration from wireless carrier signals, which allow a weak information signal to be better detected using a strong carrier signal. On an analogous note, many ERPs in the brain are hard to measure (because of noise, variance among users, etc.) and have nonlinear responses. On the other hand, there are signals (like SSVEP) that are easier to measure (due to higher SNR and lower variance). In a scenario where these two signals interact, studying the mutual information in the strong signal can be more accurate than measuring the weak signal directly. The instant study focused on brain signals, but this can be applied to any general-purpose system where there is mutual information between two variables, and measuring one variable is simpler than the other. In the context of brain signals, the approach is as follows: There is a weak signal A that is of interest. Interaction is induced between A and a strong signal B. The perturbations in B were then measured in order to detect A. This interaction between the two desired signals was created using a simultaneous stimuli design.

Biological Basis for Interaction Between Brain Signals and Experimental Evidence. Throughout decades of literature, there is evidence that investigates the brain's inadequacy in terms of multitasking [34, 35]. This limitation gives rise to interference between different brain signals in the presence of competing stimuli [34], [36] explored the performance decrements during dual tasking, which activated the same part of the cortex using fMRI, [35] also observed fMRI overlaps during multitasking and found that it is a result of interactions between concurrently running processes. Specific to ErrPs, this interaction has also been experimentally observed between ErrPs, EMG signals, P300, and even eye blinks. In 1985, [37] coined the term "response competition" to describe the interaction between EMG and ErrP activities, which prolonged the execution of the users' response during a choice-reaction task [38]. Similarly, [14] noticed reduced P300 amplitudes in the presence of larger ErrP amplitudes, and [15] detected reduced "error-squeeze" force in the presence of larger amplitudes of ERN (Error related negativity). In the instant experiments as well, it was observed that in the presence of ErrP signals, the latency of even an artifact signal like the eyeblink increases.

Mathematical Formulation. A simple non-linear time-variant memory-less system in the presence of noise can be characterized by Equations 1 and 2.

$$y(t + \delta t) = f(x(t), u)t, t) + n(t) \qquad \text{(Eq. 1)}$$

$$x(t + \delta t) = g(x(\tau), u)\tau, \tau) + n(t) \qquad \text{(Eq. 2)}$$

In Equations 1 and 2, y(t), x(t), u(t), and n(t) are the system output, system input, system state, and noise at time t, respectively. A discrete nonlinear system with memory and time-variance can be characterized using Equations 3 and 4.

$$y(k+1) = f(x(k), x(k-1), \ldots, x(k-k_0), u(k), k) + n(k+1) \quad \text{(Eq. 3)}$$

$$x(k+1) = g(x(k), x(k-1), \ldots, x(k-k_0), u(k), k) + n(k+1) \quad \text{(Eq. 4)}$$

The human brain shows variance not only based on time but also on other factors like attention levels, subject, task, environment, etc. [39, 40]. A function $\phi(\ldots)$ can be used to define all the factors that contribute to this variance in its response. The function can be parameterized using a parameter p, and all these variables can be encapsulated in the variable $\phi_p$, to provide Equations 5-7.

$$\phi(p) = \phi(\text{time}(p), \text{attention}(p), \ldots, \text{task}(p)) = \phi_p \quad \text{(Eq. 5)}$$

$$y(k+1, p) = f(x(k), x(k-1), \ldots, x(k-k_0), u(k), \phi_p) + n(k+1) \quad \text{(Eq. 6)}$$

$$x(k+1, p) = g(x(k), x(k-1), \ldots, x(k-k_0), u(k), \phi_p) + n(k+1) \quad \text{(Eq. 7)}$$

While the above equations are general, other works have proposed task-specific nonlinear model equations ERP responses. For instance, [41] presented a time-variant modeling of the brain using adaptive-filter theory, [42] modeled the ERP response using neural field theory, and [43] described the modeling of brain response and evoked potentials [44] using neural action potentials. Detecting evoked potentials (EP) and event-related potentials (ERPs) is typically based on estimating these nonlinear model parameters via statistical or machine learning models. However, due to the inherent complexity and variability of the response functions, these methods either end up being very task-specific or suffer from poor accuracy and reliability [33, 45]. On the other hand, it is much easier to detect certain other kinds of brain signals for which the brain behaves almost like a linear time-invariant (LTI) system. One such example is the SSVEP, which is elicited in the brain when a human observes rhythmic variations of visible light intensity. The brain's response to modulations of visible light and the resultant SSVEP has been modeled as an LTI system in literature [46, 47], and its detection and characterization are also based on this. Works like [48] also consider the human visual system as a linear time-invariant system with minimum phase shift and a constant delay. An LTI model for SSVEPs can then be used in the Fourier domain and is characterized per Equation 8.

$$Y_1(\omega, N, t_0) = U(\omega)F_1(\omega, N, t_0) + N_1(\omega, N, t_0) \quad \text{(Eq. 8)}$$

In Equation 8, $Y_1(\omega, N, t_0)$ and $F_1(\omega, N, t_0)$ are the Fourier transforms of the system output and the linear time-invariant impulse response at frequency $\omega$ when using a window containing N samples starting at time $t_0$ at frequency $\omega$ respectively, and $U(\omega)$ and $N_1(\omega)$ are the Fourier transforms of the input rhythmic signal (assuming it remains constant) and the noise (assuming stationarity) at frequency $\omega$. When this SSVEP signal is perturbed due to the presence of another signal, the system undergoes a perturbation which can be characterized by Equation 9.

$$Y_2(\omega, N, t_0) = Y_1(\omega, N, t_0) + \psi(\omega, N, t_0) \quad \text{(Eq. 9)}$$

In Equation 9, $\psi$ contains the additional nonlinear or linear perturbation term due to the interaction between the two signals. Due to the LTI nature of the SSVEP signal, estimating $\psi$ is simpler compared to the response of a nonlinear system, which varies with many parameters. If the presence of an event-related potential produces discernible perturbation in the SSVEP response, then an estimate of $\psi$ can be used to detect the presence or absence of the ERP by measuring a far easily detectable signal (also referred to as an auxiliary signal or strong signal in this paper).

Windowing and SNR calculation can be determined by the Welch method, in which each signal is broken into K overlapping windows, the Fourier transform of each segment is squared (PSD), and all segments are then averaged. SNR can then be calculated from this PSD because SNR at $f_0$ is the ratio of PDS at $f_0$ divided by the PSD of its N neighbors.

Algorithm Design Elements for Realization of Response Coupling. To build an algorithmic paradigm that can be used to simplify the detection or characterization of a noisy or hard-to-detect signal, the design elements and principles that are targeted for the use case of brain signals are outlined here. Firstly, the paradigm needs a weak primary signal that is typically hindered by the presence of noise, the variance within or among subjects, etc. The error-potential (ErrP) signal is a good candidate here because its detection accuracy is impaired by extremely low SNR and user variance. The paradigm also needs an auxiliary signal either exhibiting a simpler detection model and/or demonstrating significantly higher detection accuracy. The study chose the SSVEP signal as the auxiliary signal as its detection is performed under the assumption of an LTI system, and it typically demonstrates a very high detection accuracy [49]. A coupling task was then devised that is designed to facilitate the interaction between the primary and the auxiliary signal. The general framework for the proposed response coupling algorithm in brain signal detection or characterization is demonstrated in FIG. 6A. Given the main task on the primary signal and the coupling task on the auxiliary signal, two signal preprocessing pipelines were created to separately extract the target signal from different subsets of electrodes. The primary task and the coupling task were executed by their respective detection algorithms and combined together to obtain the combined result. These principles serve as recommendations, not prerequisites, to restrict the use case of response coupling.

Temporal independence: The primary and auxiliary signals can be elicited simultaneously, as not all brain signals can coexist with each other. For example, two ERPs may be unable to coexist if the required perceptual and cognitive activity is mutually exclusive. On the other hand, ERPs could naturally or artificially coexist with artifacts or SSVEPs.

Spatial and spectral independence: The primary and auxiliary signals can exhibit different spatial properties. Typically, brain signals that are elicited in different brain regions are less correlated, providing better robustness to noise. For example, eye blink is elicited from the pre-frontal region, while ErrP and SSVEP are elicited from the anterior cingulate cortex region and occipital region, respectively. If the primary and auxiliary signals are located at different subsets of electrodes, the noise between these two subsets may be less correlated, providing better robustness. In the same context, spectral independence can also simplify processing as it is easier to split the primary and auxiliary signals in the frequency domain if they coexist at some electrodes.

Complexity: The complexity of the coupling detection task can be determined by the complexity of the auxiliary detection task, which can be simpler than the primary task. "Simpler" may mean higher SNR, temporal resolution, detection accuracy, etc., and hence can achieve higher accuracy with a simpler model and smaller sample size.

The high-level architecture involves a human subject observing an AI agent navigating a maze in an Atari-based environment. The agent occasionally makes wrong moves, which generate the ErrP (our primary signal) in the subject's brain. At the same time, the maze is also flickering with a certain frequency f. This flickering is the stimulus for the SSVEP (our auxiliary signal). Thus, this setup provides stimuli that couple the responses in the subject's brain corresponding to these two signals.

Experiment, Data Collection, Evaluation

Experimental setup for data collection: The study used 3 datasets to work with our models. Two datasets were collected experimentally. The third dataset was a publicly available ErrP dataset [50] of 26 subjects, which was used for evaluating state-of-the-art approaches like EEGNet and Xdawn classifiers [32], and the same classifiers were compared against the exemplary method. The first lab dataset contained only the primary signal (ErrP), and the second lab dataset demonstrated response coupling. For the first dataset, an EEG-based BCI headset that captures the electrical activity of a subject at 125 Hz was used. An Atari-based maze game was created with a 10×10 grid containing obstacles that an AI agent navigated with the goal of reaching a target. The agent was free to move along the top/right/bottom/left directions, and it was possible to have multiple right or wrong actions. All the requisite information about the agent's actions and the rules were communicated to the study participants before the start of the experiment. The signal data of a user at any given state was linked to the game agent's location and action taken to associate signals coming from multiple users which pertained to a particular game state.

FIGS. 6B and 6C show two setups. The study used the setup shown in FIG. 6C. The study also used the BIOPAC CAP-100C electrode cap that has 21 electrodes spread across a user's scalp (FIGS. 6D-6G). The cap was connected with the OpenBCI Cyton platform, which was further connected to a desktop machine over the wireless channel. The game design was built using OpenAI Gym and was run on a screen in front of the user while minimizing any spurious audio/visual distractions. The OpenViBE software was used to gather EEG data via a TCP port and accurately time the incoming signal with the movement of the computer agent. The study utilized 12 human subjects (mean age 26.7, 2 female) using standard procedures with their consent to perform this experiment. Each subject performed ten trials, and each trial terminated with the AI agent successfully navigating the maze.

For the second dataset, the study used ten different human subjects (to avoid biased subjects who participated in the first study). ErrP and SSVEP signals were combined by adding a flicker component to the setup. "Xrandr" was used to alter the brightness of the screen as a step function with a 50% duty cycle. Ten trials per subject were performed, and in the final trial, half the subjects were asked to blink every time they saw the agent take an action, irrespective of the action being correct. This trial was not used for training or evaluation. The study also gauged the variation in observations by altering the nature of flickers in the experiment, that is, flickering the entire maze vs only the AI agent. The study only included maze flicker, as agent flicker failed to reliably elicit SSVEP signals. The time taken per subject was about 1 hour. For preprocessing the data, the signals were passed through a 4th order Butterworth filter with frequency ranges 0.5 Hz and 40 Hz, and eight electrode channels were selected that were located near the occipital, central, and parietal regions (where an interaction between ErrPs and SSVEPs was expected to be found) of the brain (the C3, C4, Cz, P3, P4, Pz, O1, O2 electrodes). The University Institutional Review Board reviewed and approved all the research protocols for all instances of user data collection.

Experimental evidence of response coupling: In order to measure the perturbation in SSVEP signals due to the presence of ErrPs, the ErrP signals and the non-ErrP signals obtained from the experiments were averaged. Their power spectral density (PSD) at multiple electrodes, as well as their sliding window Fourier transform, were then analyzed for the presence of temporal perturbations. As can be seen in FIGS. 6H-6K, the sliding window spectra differed for ErrP and non-ErrP signals, and the PSD at SSVEP frequency (7 Hz) was higher in the first part of the window than in the last part of the window for ErrP signals, while no such phenomenon was seen for non-ErrP signals. The study also obtained secondary experimental evidence of response coupling in terms of eye blink latency (time taken to begin the blinking process after a stimulus). In the dataset, the eye blinks corresponding to erroneous actions by the AI agent (eliciting an ErrP signal) had higher latency compared to eye blinks corresponding to correct actions (a mean eye-blink latency of [0.36, 0.57, 0.34, 0.35] seconds for non-ErrP signals vs. [0.37, 0.70, 0.41, 0.40] seconds for ErrP signals respectively for 4 users, 1 out of the 5 subjects had corrupted blinks). This is in line with "Response Competition," as outlined by Coles et al. in [37], where the presence of ErrP signals increased the latency of EMG signals for users' responses.

The study demonstrated how SSVEP is coupled with ErrP by analyzing two various windows of signal out of each 3-second session: the first 1.2 seconds right after each action and the last 1.2 seconds before the next action takes place. The observation window was set at 1.2 seconds since this specific length shows the strongest response coupling phenomenon. In order to filter out the high-frequency noise (>20 Hz), the rhythmic activities (>10 Hz), and the ErrP itself (<4 Hz), a Butterworth filter with frequency ranging from 4 Hz and 10 Hz ($7\pm3$ Hz) was applied, and the periodogram of the filtered signals was plotted in FIG. 6L. FIG. 6L shows the average PSD over all the subjects in the dataset. The PSD for all the cases in plots in FIG. 6L peaked at 7 Hz, indicating the existence of SSVEP at 7 Hz. In FIG. 6L, the PSD at the Cz electrode was plotted, which displays the strongest response coupling phenomenon. The signals in the first and last 1.2 seconds exhibited similar 7 Hz-peak intensity or non-ErrP. However, the 7 Hz-peak intensity in the first 1.2 seconds was increased by 50% compared to the peak intensity in the last 1.2 seconds for ErrP. Also, the signal in the last 1.2 seconds exhibited a similar curve for PSD, irrespective of the non-ErrP session or the ErrP session, further demonstrating that the coupling phenomenon prevailed in all the selected electrodes (Cz, C3, C4, Pz, P3, P4, O1 and O2). This phenomenon was then used to develop the SSVEP-coupled ErrP detection algorithm.

The coupling phenomenon was evident in the dataset. However, there existed variance between and within a subject. The response coupling was recorded by the change of peak intensity on a per-electrode and per-user basis. Table 1 lists the average increase of peak intensity at each electrode and the number of subjects exhibiting an increase in peak intensity at the corresponding electrode. Not all the electrodes exhibited strong response coupling. The central region (C) exhibited the strongest response coupling, followed by the parietal region (P) and then the occipital (O). Only the Cz electrode exhibited response coupling on all the subjects in the dataset. In Table 2, it can be seen that S10 demonstrated response coupling only at Cz. However, if S10 is treated as the outlier, the rest of the subjects exhibited evident response coupling in most of the electrodes (at least 6 out of 8 electrodes).

TABLE 1

Response coupling among different electrodes. Row A shows an increase of SSVEP (7 Hz) intensity for ErrP compared to non-ErrP. Row B shows the number of subjects exhibiting the response coupling phenomenon.

|   | Cz | C3 | C4 | Pz | P3 | P4 | O1 | O2 |
|---|---|---|---|---|---|---|---|---|
| A | 40% | 32% | 24% | 19% | 17% | 11% | 4% | 10% |
| B | 12 | 11 | 11 | 11 | 11 | 8 | 9 | 9 |

TABLE 2

Response coupling among different subjects. Row A shows the increase of SSVEP (7 Hz) intensity compared to non-ErrP. Row B shows the number of electrodes exhibiting response coupling per subject.

|   | S1 | S2 | S3 | S4 | S5 | S6 | S7 | S8 | S9 | S10 | S11 | S12 |
|---|---|---|---|---|---|---|---|---|---|---|---|---|
| A | 11% | 10% | 7% | 25% | 26% | 14% | 40% | 21% | 42% | −8% | 12% | 34% |
| B | 6 | 8 | 6 | 8 | 8 | 7 | 8 | 8 | 6 | 1 | 8 | 8 |

Figure 6O:
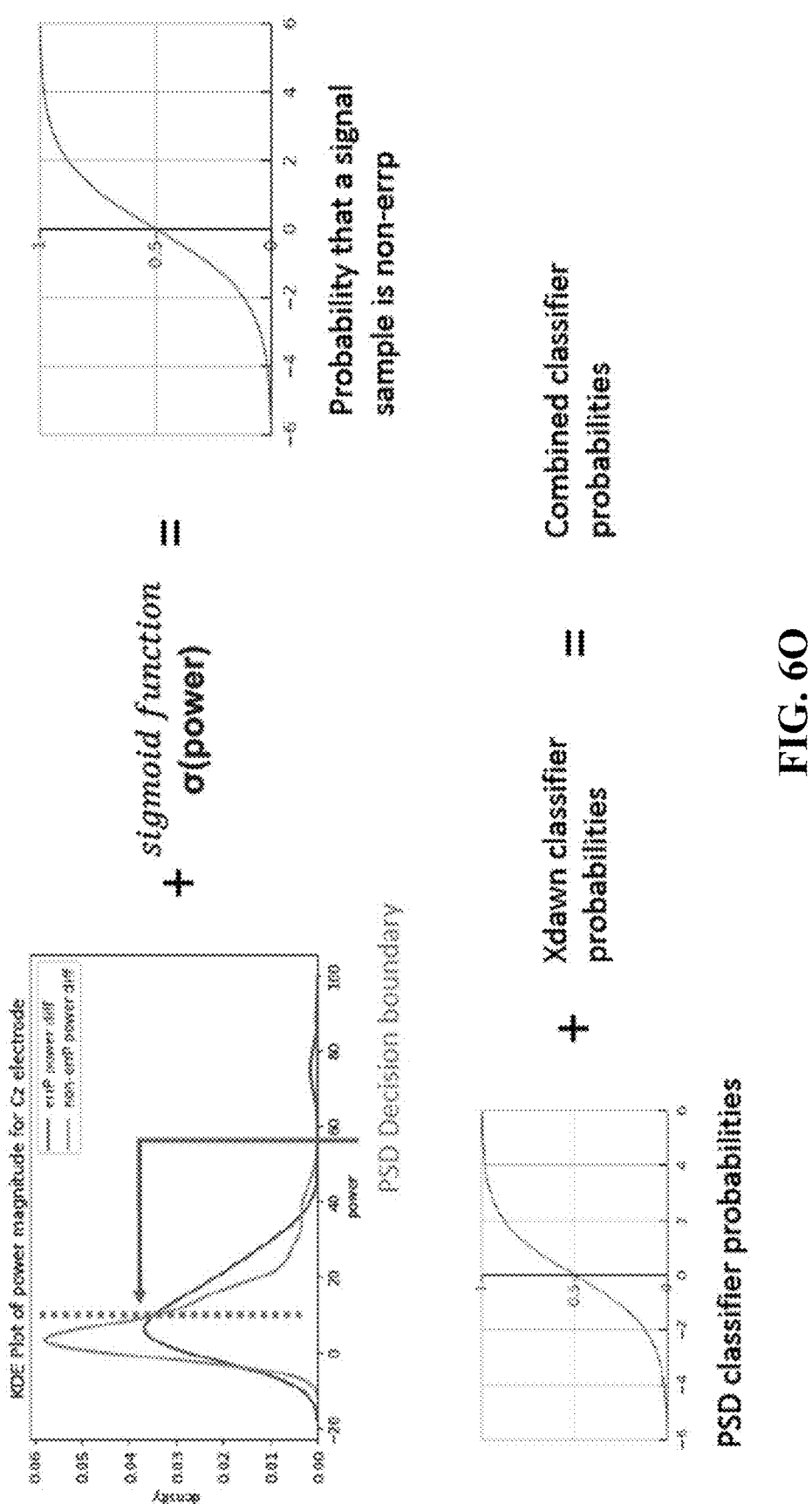
FIG. 6O show example analysis performed as a part of the study.

Detection performance based on response coupling: The discriminatory behavior of SSVEP PSD in the presence of ErrPs was exploited to create a simplistic Bayesian classifier. This classifier was combined with the existing classification pipeline (Xdawn+tangent space classifier) to create a composite classifier that detected the presence of ErrP signals (FIG. 6O). The evaluation numbers are shown in Table 3, which compares the disclosed method against the state-of-the-art Xdawn+tangent space classifier, Xdawn+MDM (minimum distance to mean) classifier, and EEGNet.

TABLE 3

Comparison of averaged balanced accuracy over all the training users (model trained on a per-user basis). N/A stands for not applicable.

| Datasets | EEGNet | Xdawn + tangent space | Xdawn + MDM | PSD clf | Xdawn + Tangent + PSD |
|---|---|---|---|---|---|
| Public ErrP dataset | 73.54% | 64.32% | 65.18% | N/A | N/A |
| Lab dataset (ErrP) | 67.0% | 64.9% | 65.4% | N/A | N/A |
| Lab dataset (ErrP + SSVEP) | 63.5% | 58.9% | 57.11% | 62.04% | 70.77% |

The other classifiers were also evaluated on the lab datasets as well as a publicly available dataset, as shown in FIGS. 6M and 6N. Throughout this evaluation, per-user evaluation was used instead of ensemble methods as in preceding works (ensemble approaches generally perform better due to the availability of more data, which is why individual user evaluation was preferred in order to see performance w.r.t limited data). Balanced accuracy ((TPR+TNR)/2)2 was used for evaluating the models because it is an excellent metric for unbalanced classes, which eliminates biased models that excessively favor either the positive or the negative class. For every user, k-fold cross-validation with k=5 was used, and each instance was simulated four times, thus yielding 20 simulations per user. The final average balanced accuracy was the average per-user balanced accuracy for all users.

Classifier design: As per the observations in Table 1, a probability density distribution curve was created based on the difference between the PSD for the first and the last window at SSVEP frequency, using the training samples (80:20 split). Based on this distribution, a simple Bayesian decision boundary was passed through a sigmoid function to create a simple Bayesian classifier that output the probability that a given sample was an ErrP or not (FIG. 6O). This classifier was called the "PSD classifier," and it outperformed Xdawn models and came close to EEGNet on the dataset, as seen in Table 3. The probabilities of the PSD classifier and of the Xdawn+tangent space classifier were averaged to create the composite model, as shown in FIG. 6A.

TABLE 3 shows that this combined classifier performed significantly better than the other outlined approaches on the dataset, which showcases response coupling. The PSD classifier was also combined with EEGNet with probability weights of 0.1 and 0.9, respectively, which yielded a balanced accuracy of 65.0% for the dataset with ErrP and SSVEP (an improvement of 1.5%). Equal averaging of EEGNet and PSD probabilities did not yield any improvement over EEGNet, however. While this showcases that a classifier based on exploiting this phenomenon, when combined with existing state-of-the-art models, achieves superior performance, there are certain design considerations and optimizations that are still possible. For example, one aspect to be investigated is the optimal method of combining the PSD classifier with the primary ErrP detection model. Further, the optimal activation function and its parameters for generating probabilities from PSD differentials can also be studied in detail.

Discussion Electrical activity in the brain is measured via the presence or absence of certain signals/potentials. Many event-related potentials are hard to measure (because of the presence of noise, variance among users and environments, etc.). On the other hand, there are signals (like SSVEP) which are easier to measure (they have high SNR and do not show variance across individuals).

In a scenario where these two kinds of signals interact, measuring the signal, which is easier to detect, and using its recorded value or perturbations in it to infer information about the weak signal is more efficient than measuring the weak signal directly. To simplify, instead of directly estimating a difficult-to-measure quantity A, it is more efficient to estimate an easier-to-measure quantity B, which is affected by A, to infer information about A. To further simplify, quantity A is hard to measure, and quantity B is easy to measure. Quantity A interacts with quantity B and alters its properties. By measuring the changed properties of quantity B, information about quantity A can be inferred.

This method can be implemented for measuring concentration of an ion in solution. To measure the concentration of a particular kind of ion in a solution, directly estimating the concentration is difficult. Another chemical can be introduced, which reacts with the ion and precipitates it, and the precipitated weight can be used to calculate the original concentration.

Table 4 shows results of combining the multiple classifiers. Channels Fz and Cz were the only ones which provided a satisfactory PSD classifier accuracy (>55% for 14 subjects) so we only used those two channels for classification.

TABLE 4

Results of combining the multiple classifiers.

| No of subjects | PSD classifier accuracy (Cz) | PSD classifier accuracy (Fz) | Xdawn classifier accuracy | Combined Classifier accuracy (Xdawn + Cz) | Combined classifier accuracy 2 (Xdawn + Cz + Fz) |
|---|---|---|---|---|---|
| 14 subjects | 58.68 | 59.03 | 60.67 | 65.84 | 66.72 |

Example #2—Using Response Competition Between Multiple Competing Signals to Simplify Decoding and Recalibration for a Linear/Non-Linear Time-Variant System Like the Human Brain Another study, referred to herein as second study, was conducted which combined ErrP (primary signal) and SSVEP signals (auxiliary signal) by modifying the study's experimental setup for the maze game and adding a flicker component to it. The example device used bash script and xrandr (an official configuration utility in Ubuntu) to alter the brightness of the screen. The example device followed the step function mode of flickering (as opposed to a sinusoidal flicker) the screen with a 50% duty cycle. The study found that observing the maze game without the flicker induced an ErrP signal in the human brain, and observing the flickering induced an SSVEP signal in the human brain. The study gauged the variation in the study's observations by altering the nature of flickers in the studied experiment. Specifically, the study implemented a maze game where only the AI agent flickers while moving, as previously, and a maze game where the whole maze and the AI agent flicker with a specific frequency.

To gauge the effects of parameters like SSVEP frequency and the ErrP signal window size (time taken between each action taken by the AI agent), these parameters were also varied in the experiments. The parameter values are not exhaustive and other ranges of values and electrodes can also be used. For preprocessing the data, the example device passed the signals through a 4th order Butterworth filter with frequency ranges 0.5 Hz and 40 Hz and then selected eight electrode channels that are located near the occipital cortex region (where the SSVEP signals are elicited) and the anterior cingulate cortex region (where ErrP signals are elicited) of the brain (the C3, C4, Cz, P3, P4, Pz, O1, O2 electrodes).

The example device averaged the ErrP signals and the non-ErrP signals obtained from one instance of the studied experiments (SSVEP frequency=10 Hz with the whole maze flickering). The study then plotted their power spectral density (PSD) at O1 and O2 electrodes (the instance where only the agent flickers failed to reliably elicit SSVEP signals). The study observed that while the PSD spectrum at O1 and O2 appears like that of a regular SSVEP signal (peaks at the SSVEP frequency and the first harmonic) for non-ErrP signals, the spectrum did not exhibit discernible peaks at the SSVEP frequency and its first harmonic for ErrP signals. The example device studied can also be advantageous because it modifies the system only at the outermost layer (or input signal) and does not need to introduce complications in the system itself. Furthermore, the example device has massive potential for applications in designing and maintaining infrastructure working with NLTV systems where it is hard to model the system's response for an input. This method also has applications in systems where recalibrating a model is expensive or non-trivial. By essentially converting an NLTV system into a time-invariant system, the example device can essentially simplify the infrastructure needed to work with these systems.

For example, an EEG BCI headset/cap, which records EEG signals from a user's scalp, was used. The example device used the biopac EEG electrode cap (CAP100C), but this method can be implemented with any BCI headset with one/multiple electrodes or sensors that can capture brain signals via electric (EEG, EMG, etc.), magnetic (MEG, MRI, fMRI, etc.), or spectral technologies (NIRS, fNIRS, etc.) A cyton biosensing board was used that captures the signals from the cap and relays them to BCI software on a computer or processing system. The visual environment was created using openAI gym framework and python as well as some bash scripts on a Unix platform. It should be understood that the visual environment can also be created using any other software/hardware systems The electrode cap was attached with the OpenBCI Cyton7 platform, which was further connected to a desktop machine over the wireless channel. The study used daisy module extension with OpenBCI Cyton to allow continuous sampling of brainwaves from 16 electrodes at 125 Hz. ADS1299 designed by Texas Instruments, the heart of OpenBCI, converts the raw analog signals to digital samples. The study used OpenViBE, a software platform developed in INRIA, France, to collect the digitized sampled brainwaves and synchronize them with the game status. Open ViBE continuously listens to the TCP port (for state-action pairs) and timestamps the EEG data in a synchronized manner.

The example device can pair brain signals with an easily detectable signal and measure the degradation in its performance to infer if the first signal is present. A non-limiting example of an easily detectable signal is SSVEP. Further non-limiting examples of SSVEP paradigms are—light source stimulus (e.g., LED), offset-onset, and Pattern reversal. Examples of each are shown in FIG. 7A.

The was performed on the example device using a maze game where an AI agent navigates a maze while occasionally making wrong moves. SSVEP was chosen as a secondary stimulus, and screen brightness flickering with a 50% cycle step function, where SSVEP frequency was chosen near IAF. Different frequency choices can be used for the SSVEP. Optionally, the SSVEP frequency can be chosen near the individual alpha frequency (IAF) of a user. Alpha-band oscillations can be the most dominant frequency in the adult human brain, with a mean frequency of approximately 10 Hz and a range in oscillation of 7.5-12.5 Hz [1]. SSVEPs can be a result of the entrainment of the brain's natural rhythms [2].

In the study, the signals were pre-processed by passing them through a 4th-order Butterworth filter between 0.5 Hz and 40 Hz. The data was acquired from 8 electrodes in the central, parietal, and occipital regions (C3, C4, Cz, P3, P4, Pz, O1, O2).

FIG. 7B illustrates an example of the maze game studied, and FIG. 7C illustrates a test subject. It should be understood that the data acquisition, maze game, screen flickering duty cycle, pre-processing, number of electrodes, and electrode positions described herein are intended only as non-limiting examples.

With reference to FIGS. 7D-7I, observations from the study are shown. The ErrP and non-ErrP signals were averaged, and the power-spectral density of the aggregate signals at occipital lobe electrodes is shown. FIGS. 7D-7E and FIG. 7H show the signals when ErrP is present, and FIGS. 7F-7G and FIG. 7I show the signal when ErrP is not present. As shown in FIGS. 7D-7I, there are discernible peaks at the SSVEP flicker frequency and its first harmonic for non-ErrP signals, while the same cannot be said about ErrP signals. This suggests that SSVEP signals suffer attenuation in the presence of ErrP signals. This is based in neuroscience. "Response competition" can be observed when a participant elicits multiple EMG responses for a stimulus [55]. This response competition not only reduces the force exerted by the participants in experiments but also delays the P300 peak, which was subsequently observed. "Response competition" can be primarily responsible for the degradation in SSVEP signal quality when the user is also presented with an ErrP stimulus. This observation enables the example device to set up a dependence between SSVEP and ErrP signals such that the degradation of SSVEP signals can be correlated with the occurrence of an ErrP signal in the brain. This can greatly improve the detection accuracy of ErrP signals with little modification to the experimental setup.

Figure 7J:
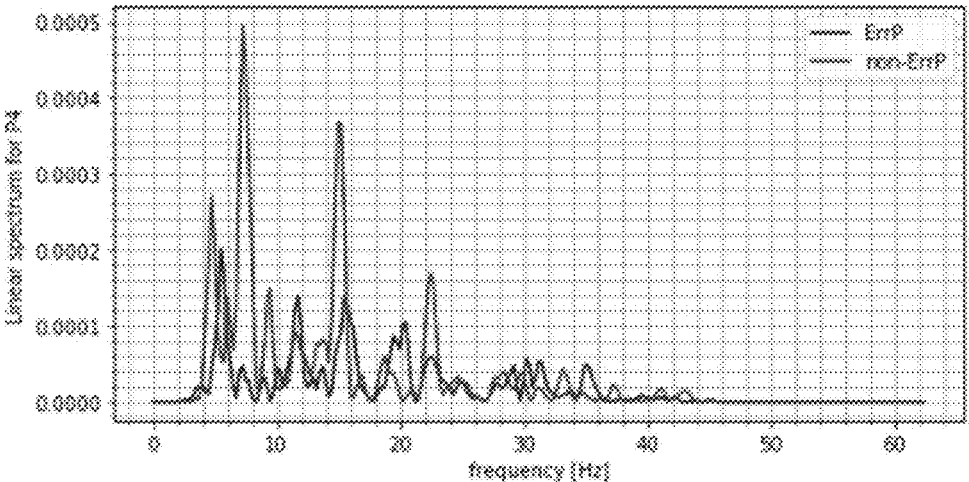
FIGS. 7J-7K depict combined spectra for ErrP and non-ErrP signals at P4 for SSVEP frequency=7 Hz.
Figure 7K:
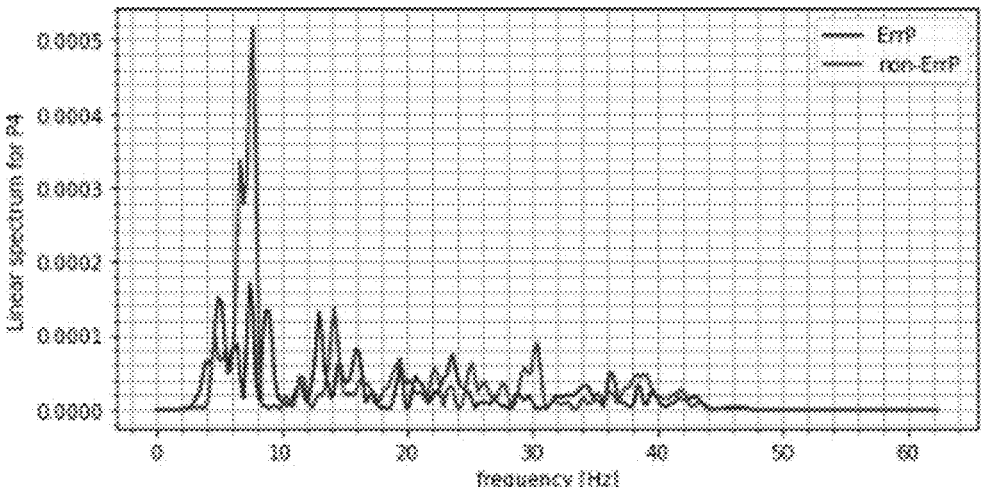

Seeing that 10 Hz is close to the Individual Alpha Frequency for a user, the study repeated these experiments with the SSVEP frequency equal to 7 Hz. The resultant FIGS. 7J-7K show where the study observed a similar phenomenon.

This phenomenon, seen on the average signals, can be used on individual signals when the example device isolates the signal component from the noise more effectively in our system.

Figures 7L, 7M:
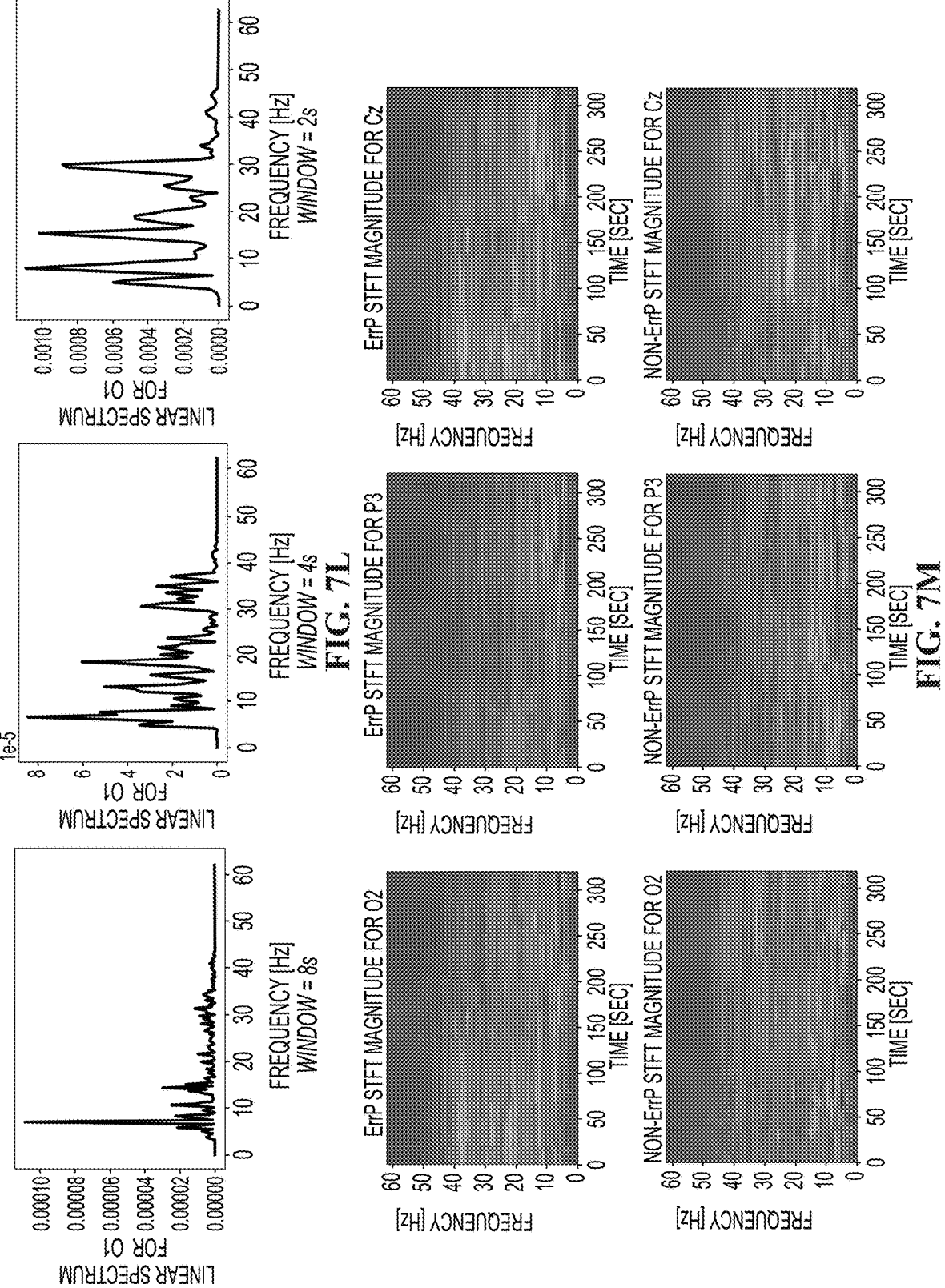
FIGS. 7L-7M depict the variation and dependence of the SSVEP component with time.

FIGS. 7L-7T illustrate yet more results from the study at different frequencies and time windows. FIGS. 7L-7N illustrate the effect of window size (time between each move of the AI agent). FIGS. 7-7T illustrate the dependence of the SSVEP component with time.

Example Computing System

It should be appreciated that the logical operations described above can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or can be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM)), non-volatile (such as read-only memory (ROM), flash memory, etc.), or some combination of the two.

The processing unit may be a standard programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

Computing devices may have additional features/functionality. For example, the computing device may include additional storage such as removable storage and non-removable storage including, but not limited to, magnetic or optical disks or tapes. Computing devices may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing devices may also have input device(s) such as keyboards, keypads, switches, dials, mice, track-balls, touch screens, voice recognizers, card readers, paper tape readers, or other well-known input devices. Output device(s) such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory 230, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embed-ded computer systems, personal digital assistants, and other types of computing devices known to those skilled in the art.

In an example implementation, the processing unit may execute program code stored in the system memory. For example, the bus may carry data to system memory 230, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming inter-face (API), reusable controls, or the like. Such programs may be implemented in a high-level procedural or object-oriented programming language to communicate with a computer system. However, the program(s) can be imple-mented in assembly or machine language, if desired. In any case, the language may be a compiled or interpreted lan-guage, and it may be combined with hardware implemen-tations.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present dis-closure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other com-pounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications as listed below and throughout this document are hereby incorporated by reference in their entirety herein.

REFERENCE LIST

[1] E. Gupta, M. Agarwal, and R. Sivakumar. Blink to get in: Biometric authentication for mobile devices using eeg signals. In ICC 2020—2020 IEEE International Conference on Communications (ICC), pages 1-6, 2020.

[2] Anton Nijholt. Bci for games: A 'state of the art' survey. Lecture Notes in Computer Science, 5309 LNCS:225-228, 2008.

[3] Xu Duan, Songyun Xie, Xinzhou Xie, Ya Meng, and Zhao Xu. Quadcopter flight control using a non-invasive multi-modal brain computer interface. Frontiers in Neurorobotics, 13, 2019.

[4] Athanasios Vourvopoulos, Octavio Marin Pardo, Stéphanie Lefebvre, Meghan Neureither, David Saldana, Esther Jahng, and Sook-Lei Liew. Effects of a brain-computer interface with virtual reality (vr) neurofeedback: A pilot study in chronic stroke patients. Frontiers in Human Neuroscience, 13, 2019.

[5] Brain computer interface market size forecast, https://www.alliedmarketresearch.com/brain-computer-interfaces-market, 2021.

[6] Brain computer interface market size, https://www.precedenceresearch.com/brain-computer-interface-market, 2021.

[7] Brain computer interface market size, https://www.grandviewresearch.com/industry-analysis/brain-computer-interfaces-market, 2021.

[8] Marcel Van Gerven, Jason Farquhar, Rebecca Schaefer, Rutger Vlek, Jeroen Geuze, Anton Nijholt, Nick Ramsey, Pim Haselager, Louis Vuurpijl, Stan Gielen, and Peter Desain. The brain-computer interface cycle. Journal of Neural Engineering, 6, 2009.

[9] Rodrigo Ramele, Ana Julia Villar, and Juan Miguel Santos. Eeg waveform analysis of p300 erp with applications to brain computer interfaces. Brain sciences, 8, November 2018.

[10] Nicolas Chauveau, Xavier Franceries, Bernard Doyon, Bernard Rigaud, Jean Pierre Morucci, and Pierre Celsis. Effects of skull thickness, anisotropy, and inhomogeneity on forward eeg/erp computations using a spherical three-dimensional resistor mesh model. Human Brain Mapping, 21:86, February 2004.

[11] Aleksandra Kawala-Sterniuk, Natalia Browarska, Amir Al-Bakri, Mariusz Pelc, Jaroslaw Zygarlicki, Michaela Sidikova, Radek Martinek, and Edward Jacek Gorzelanczyk. Summary of over fifty years with brain-computer interfaces—a review. Brain Sciences 2021, Vol. 11, Page 43, 11:43, January 2021.

[12] L. A. Farwell and E. Donchin. Talking off the top of your head: toward a mental prosthesis utilizing event-related brain potentials. Electroencephalography and clinical neurophysiology, 70:510-523, 1988.

[13] Jonathan R. Wolpaw, Dennis J. McFarland, Gregory W. Neat, and Catherine A. Forneris. An eeg-based brain-computer interface for cursor control. Electroencephalography and clinical neurophysiology, 78:252-259, 1991.

[14] M. Falkenstein, J. Hohnsbein, J. Hoormann, and L. Blanke. Effects of crossmodal divided attention on late erp components. ii. error processing in choice reaction tasks. Electroencephalography and Clinical Neurophysiology, 78:447-455, June 1991.

[15] William J. Gehring, Brian Goss, Michael G. H. Coles, David E. Meyer, and Emanuel Donchin. A neural system for error detection and compensation. Psychological Science, 4(6):385-390, 1993.

[16] Michael Falkenstein, Joachim Hohnsbein, Joerg Hoormann, and L. Blanke. Effects of crossmodal divided attention on late erp components. ii. error processing in choice reaction tasks. Electroencephalography and clinical neurophysiology, 78 6:447-55, 1991.

[17] Michael Falkenstein, Jörg Hoormann, Stefan Christ, and Joachim Hohnsbein. Erp components on reaction errors and their functional significance: A tutorial. Biological Psychology, 51:87-107, February 2000.

[18] Wolfgang H. R. Miltner, Christoph H. Braun, and Michael G. H. Coles. Event-related brain potentials following incorrect feedback in a time-estimation task: Evidence for a "generic" neural system for error detection. J. Cognitive Neuroscience, 9(6):788-798, November 1997.

[19] Aline Xavier Fidêncio, Christian Klaes, and Ioannis lossifidis. Error-related potentials in reinforcement learning-based brain-machine interfaces. Frontiers in Human Neuroscience, 16:392, June 2022.

[20] Gabriel Pires, Miguel Castelo-Branco, Christoph Guger, and Giulia Cisotto. Editorial: Error-related potentials: Challenges and applications. Frontiers in Human Neuroscience, 16:504, July 2022.

[21] Duo Xu, Mohit Agarwal, Ekansh Gupta, Faramarz Fekri, and Raghupathy Sivakumar. Accelerating reinforcement learning using eeg-based implicit human feedback. Neurocomputing, 460:139-153, October 2021.

[22] Bertrand Rivet, Antoine Souloumiac, Virginie Attina, and Guillaume Gibert. xdawn algorithm to enhance evoked potentials: application to brain-computer interface. IEEE Transactions on Biomedical Engineering, 56(8):2035-2043, 2009.

[23] Mahnaz Arvaneh, Cuntai Guan, Kai Keng Ang, and Hiok Chai Quek. Spatially sparsed common spatial pattern to improve bci performance. ICASSP, IEEE International Conference on Acoustics, Speech and Signal Processing—Proceedings, pages 2412-2415, 2011.

[24] Ning Jiang, Leonardo Gizzi, Natalie Mrachacz-Kersting, Kim Dremstrup, and Dario Farina. A brain-computer interface for single-trial detection of gait initiation from movement related cortical potentials. Clinical Neurophysiology, 126:154-159, January 2015.

[25] Vaibhav Gandhi, Girijesh Prasad, Damien Coyle, Laxmidhar Behera, and Thomas Martin McGinnity. Quantum neural network-based eeg filtering for a brain-computer interface. IEEE Transactions on Neural Networks and Learning Systems, 25:278-288, February 2014.

[26] Siamac Fazli, Jan Mehnert, Jens Steinbrink, Gabriel Curio, Arno Villringer, Klaus Robert Müller, and Benjamin Blankertz. Enhanced performance by a hybrid nirs-eeg brain computer interface. NeuroImage, 59:519-529, January 2012.

[27] Minpeng Xu, Hongzhi Qi, Baikun Wan, Tao Yin, Zhipeng Liu, and Dong Ming. A hybrid bci speller paradigm combining p300 potential and the ssvep blocking feature. Journal of Neural Engineering, 10:026001, January 2013.

[28] James Dowsett, Marianne Dieterich, and Paul C. J. Taylor. Mobile steady-state evoked potential recording: Dissociable neural effects of real-world navigation and visual stimulation. Journal of Neuroscience Methods, 332:108540, February 2020.

[29] Xu Lei, Ping Yang, Peng Xu, Tie-Jun Liu, and Dezhong Yao. Common spatial pattern ensemble classifier and its application in brain-computer interface. J Electronic Science and Technology of China, 7, January 2009.

[30] Alexandre Barachant, Stéphane Bonnet, Marco Congedo, and Christian Jutten. Classification of covariance matrices using a riemannian-based kernel for bci applications. Neurocomputing, 112:172-178, 2013.

[31] Robin Tibor Schirrmeister, Jost Tobias Springenberg, Lukas Dominique Josef Fiederer, Martin Glasstetter, Katharina Eggensperger, Michael Tangermann, Frank Hutter, Wolfram Burgard, and Tonio Ball. Deep learning with convolutional neural networks for eeg decoding and visualization. Human Brain Mapping, 38:5391-5420, November 2017.

[32] Vernon J Lawhern, Amelia J Solon, Nicholas R Waytowich, Stephen M Gordon, Chou P Hung, and Brent J Lance. Eegnet: a compact convolutional neural network for eeg-based brain-computer interfaces. Journal of Neural Engineering, 15:056013, July 2018.

[33] Simanto Saha, Khondaker A. Mamun, Khawza Ahmed, Raqibul Mostafa, Ganesh R. Naik, Sam Darvishi, Ahsan H. Khandoker, and Mathias Baumert. Progress in brain computer interface: Challenges and opportunities. Frontiers in Systems Neuroscience, 15:4, February 2021.

[34] Kevin P. Madore and Anthony D. Wagner. Multicosts of multitasking. Cerebrum: the Dana Forum on Brain Science, 2019, 2019.

[35] Menno Nijboer, Jelmer Borst, Hedderik van Rijn, and Niels Taatgen. Single-task fmri overlap predicts concurrent multitasking interference. NeuroImage, 100:60-74, October 2014.

[36] Mona Moisala, Viljami Salmela, Emma Salo, Synnöve Carlson, Virve Vuontela, Oili Salonen, and Kimmo Alho. Brain activity during divided and selective attention to auditory and visual sentence comprehension tasks. Frontiers in Human Neuroscience, 9:86, February 2015.

[37] Michael G. H. Coles, Gabriele Gratton, Theodore R. Bashore, Charles W. Eriksen, and Emanuel Donchin. A psychophysiological investigation of the continuous flow model of human information processing. Journal of Experimental Psychology: Human Perception and Performance, 11:529-553, October 1985.

[38] Rebecca C. Trueman, Simon P. Brooks, and Stephen B. Dunnett. Choice Reaction Time and Learning, pages 534-537. Springer US, Boston, M A, 2012.

[39] Douglas D. Garrett, Gregory R. Samancz-Larkin, Stuart W. S. MacDonald, Ulman Lindenberger, Anthony R. McIntosh, and Cheryl L. Grady. Moment-to-moment brain signal variability: A next frontier in human brain mapping? Neuroscience and biobehavioral reviews, 37:610, May 2013.

[40] Erin Gibson, Nancy J. Lobaugh, Steve Joordens, and Anthony R. McIntosh. Eeg variability: Task-driven or subject-driven signal of interest? NeuroImage, 252: 119034, May 2022.

[41] Lutz Leistritz, Karin Schiecke, Laura Astolfi, and Herbert Witte. Time-variant modeling of brain processes. Proceedings of the IEEE, 104:262-281, February 2016.

[42] M. S. Zobaer, R. M. Anderson, C. C. Kerr, P. A. Robinson, K. K. H. Wong, and A. L. D'Rozario. K-complexes, spindles, and erps as impulse responses: unification via neural field theory. Biological Cybernetics, 111: 149-164, April 2017.

[43] Christopher John Rennie. Modeling the large-scale electrical activity of the brain. January 2001.

[44] C. J. Rennie, P. A. Robinson, and J. J. Wright. Unified neurophysical model of eeg spectra and evoked potentials. Biological cybernetics, 86:457-471, 2002.

[45] Haider Raza, Dheeraj Rathec, Shang Ming Zhou, Hubert Cecotti, and Girijesh Prasad. Covariate shift estimation based adaptive ensemble learning for handling non-stationarity in motor imagery related eeg-based brain-computer interface. Neurocomputing, 343:154-166, May 2019.

[46] L. H. van der Tweel and H. F. E. Verduyn Lunel. Human visual responses to sinusoidally modulated light. Electroencephalography and Clinical Neurophysiology, 18:587-598, 1965.

[47] Carlos E. Davila and Richard Srebro. Subspace averaging of steady-state visual evoked potentials. IEEE Transactions on Biomedical Engineering, 47:720-728, 2000.

[48] M. A. Lopez-Gordo, A. Prieto, F. Pelayo, and C. Morillas. Use of phase in brain-computer interfaces based on steady-state visual evoked potentials. Neural Processing Letters, 32:1-9, August 2010.

[49] Yijun Wang, Zhiguang Zhang, Xiaorong Gao, and Shangkai Gao. Lead selection for ssvep-based brain-computer interface. In The 26th Annual International Conference of the IEEE Engineering in Medicine and Biology Society, volume 2, pages 4507-4510, 2004.

[50] Perrin Margaux, Maby Emmanuel, Daligault Sébastien, Bertrand Olivier, and Mattout Jérémie. Objective and subjective evaluation of online error correction during p300-based spelling. Advances in Human-Computer Interaction, 2012:4-4, 2012.

[51] Yann Renard, Fabien Lotte, Guillaume Gibert, Marco Congedo, Emmanuel Maby, Vincent Delannoy, Olivier Bertrand, and Anatole Lécuyer. Openvibe: An open-source software platform to design, test, and use brain-computer interfaces in real and virtual environments. Presence: teleoperators and virtual environments, 19(1): 35-53, 2010.

[52] Surej Mouli and Ramaswamy Palaniappan. Toward a reliable pwm-based light-emitting diode visual stimulus for improved ssvep response with minimal visual fatigue. The Journal of Engineering, 2017:7-12, February 2017.

[53] Klimesch, W. (1999). EEG alpha and theta oscillations reflect cognitive and memory performance: A review and analysis. Brain Research Reviews.

[54] Notbohm A, Kurths J, Herrmann C S. Modification of Brain Oscillations via Rhythmic Light Stimulation Provides Evidence for Entrainment but Not for Superposition of Event-Related Responses. Front Hum Neurosci. 2016.

[55] Michael G. H. Coles, Gabriele Gratton, Theodore R. Bashore, Charles W. Eriksen, and Emanuel Donchin. A psychophysiological investigation of the continuous flow model of human information processing. Journal of Experimental Psychology: Human Perception and Performance, 11:529-553, October 1985.

[56] Salazar-Gomez, Andres F., et al. "Correcting robot mistakes in real time using EEG signals." 2017 IEEE international conference on robotics and automation (ICRA). IEEE, 2017

What is claimed is:

1. A system comprising:

a processor; and a memory having instructions stored thereon, wherein execution of the instructions by the processor causes the processor to:

receive measurements of an observed signal that is a physiological response evoked by presentation of a stimulus;

determine, via response coupling that employs a test instrument configured to select a property of the observed signal to amplify an unobserved signal and facilitate interactions between the observed signal and the unobserved signal, a probability value of a presence or non-presence of the unobserved signal via a trained classifier, wherein: (i) the unobserved signal is associated with a non-linear time-variant system, (ii) the observed signal and the unobserved signal are concurrently measured and originate from different sources such that the unobserved signal is not a component of the stimulus, and (iii) the trained classifier was trained based on training data comprising a plurality of measured unobserved signals acquired when a corresponding observed signal is present;

in response to determining a probability value indicating the presence of the unobserved signal, determine one or more inferred properties of the unobserved signal based on one or more observed signal properties; and control a computing system or perform a diagnostic operation based, at least in part, on the one or more inferred properties.

2. The system of claim 1, wherein the observed signal is acquired via a brain-computer interface (BCI).

3. The system of claim 1, wherein the instructions to determine the probability value of a presence or non-presence of an unobserved signal comprises:

instructions to generate (i) a first band signal having frequency range from a first frequency to a second frequency of the observed signal, (ii) a second band signal having frequency range from the second frequency to a third frequency of the observed signal, (iii) a third band signal having frequency range from the third frequency to a fourth frequency of the observed signal; and instructions to provide the first band signal, the second band signal, the third band signal, and a source signal of the first band signal, the second band signal, the third band signal to the trained classifier.

4. The system of claim 1, wherein the instructions to determine the probability value of a presence or non-presence of an unobserved signal comprises:

instructions to generate a probability density distribution curve from a difference between a first window of signal frequency of the observed signal and a second window of signal frequency of the observed signal, wherein the first window and the second window have different frequencies, and instructions to determine the probability value of the presence or non-presence of the unobserved signal via a Bayesian classifier.

5. A method comprising:

receiving, by a processor, measurements of an observed signal that is a physiological response evoked by presentation of a stimulus;

determining, by the processor via response coupling, that employs a test instrument configured to select a property of the observed signal to amplify an unobserved signal and facilitate interactions between the observed signal and the unobserved signal, a probability value of a presence or non-presence of the unobserved signal via a trained classifier, wherein: (i) the unobserved signal is associated with a non-linear time-variant system, (ii) the observed signal and the unobserved signal are concurrently measured and originate from different sources such that the unobserved signal is not a component of the stimulus, and (iii) the trained classifier was trained based on training data comprising a plurality of measured unobserved signals acquired when a corresponding observed signal is present;

in response to determining, by the processor, a probability value indicating the presence of the unobserved signal, determining one or more inferred properties of the unobserved signal based on one or more observed signal properties; and controlling, by the processor, a computing system or performing a diagnostic operation based, at least in part, on the one or more inferred properties.

6. The method of claim 5, wherein the measurements of the observed signal are acquired as a physiological response to a stimulus.

7. The method of claim 5, wherein the observed signal comprises an offset-onset SSVEP signal or a pattern reversal SSVEP.

8. The method of claim 5, wherein the observed signal is acquired via a brain-computer interface (BCI).

9. The method of claim 5, wherein the observed signal was acquired while a display is contemporaneously presenting an observable error in movement or action of a graphical element.

10. The method of claim 5, wherein the probability value of the presence of the unobserved signal, or a value derived therefrom, is employed as a human-in-the-loop input signal for an AI training system.

11. The method of claim 10, wherein the AI training system is configured to generate a trained AI system for control of a robot.

12. The method of claim 10, wherein the AI training system is configured to generate a trained AI system for control of a computing task.

13. The method of claim 5, wherein determining the probability value of a presence or non-presence of an unobserved signal comprises:

generating a probability density distribution curve from a difference between a first window of signal frequency of the observed signal and a second window of signal frequency of the observed signal, wherein the first window and the second window have different frequencies, and determining the probability value of the presence or non-presence of the unobserved signal via a Bayesian classifier.

14. The method of claim 13, wherein the probability value of presence or non- presence of the unobserved signal is a composite score from two or more scores, including a score from the Bayesian classifier.

15. A non-transitory computer-readable medium having instructions stored thereon, wherein execution of the instructions by a processor causes the processor to:

receive measurements of an observed signal that is a physiological response evoked by presentation of a stimulus;

determine, via response coupling that employs a test instrument configured to select a property of the observed signal to amplify an unobserved signal and facilitate interactions between the observed signal and the unobserved signal, a probability value of a presence or non-presence of the unobserved signal via a trained classifier, wherein: (i) the unobserved signal is associated with a non-linear time-variant system, (ii) the observed signal and the unobserved signal are concurrently measured and originate from different sources such that the unobserved signal is not a component of the stimulus, and (iii) the trained classifier was trained based on training data comprising a plurality of measured unobserved signals acquired when a corresponding observed signal is present;

in response to determining a probability value indicating the presence of the unobserved signal, determining one or more inferred properties of the unobserved signal based on one or more observed signal properties; and control a computing system or perform a diagnostic operation based, at least in part, on the one or more inferred properties.

16. The non-transitory computer-readable medium of claim 15, wherein the observed signal is acquired via a brain-computer interface (BCI).

17. The non-transitory computer-readable medium of claim 15, wherein the observed signal has a simultaneous combined response in a subject with the unobserved signal.

18. The non-transitory computer-readable medium of claim 15, wherein the probability value of the presence of the unobserved signal, or a value derived therefrom, is employed as a human-in-the-loop control signal.

\* \* \* \* \*